United States Patent
Oki

(10) Patent No.: US 12,373,657 B2
(45) Date of Patent: Jul. 29, 2025

(54) MOBILE CODE READING DEVICE AND CODE READING METHOD

(71) Applicant: KEYENCE CORPORATION, Osaka (JP)

(72) Inventor: Shusuke Oki, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 44 days.

(21) Appl. No.: 18/409,028

(22) Filed: Jan. 10, 2024

(65) Prior Publication Data

US 2024/0281628 A1 Aug. 22, 2024

(30) Foreign Application Priority Data

Feb. 10, 2023 (JP) .................................. 2023-019186

(51) Int. Cl.
*G06K 7/10* (2006.01)
(52) U.S. Cl.
CPC .............................. *G06K 7/10732* (2013.01)
(58) Field of Classification Search
None
See application file for complete search history.

(56) References Cited

U.S. PATENT DOCUMENTS

| 7,537,164 | B2 | 5/2009 | Joseph et al. | |
| 7,852,519 | B2 | 12/2010 | Meier et al. | |
| 2006/0006231 | A1 | 1/2006 | Anson et al. | |
| 2014/0097251 | A1* | 4/2014 | Joussen | G06K 7/1491 235/462.07 |
| 2014/0239071 | A1* | 8/2014 | Hennick | G06K 7/1439 235/455 |
| 2016/0314331 | A1* | 10/2016 | Wang | G06K 7/1408 |
| 2021/0111580 | A1 | 4/2021 | Barkan et al. | |

OTHER PUBLICATIONS

Related co-pending application: U.S. Appl. No. 18/409,075, filed Jan. 10, 2024, counterpart Japanese Patent Application No. 2023-019189.
Related co-pending application: U.S. Appl. No. 18/409,115, filed Jan. 10, 2024, counterpart Japanese Patent Application No. 2023-019190.
Related co-pending application: U.S. Appl. No. 18/409,229, filed Jan. 10, 2024, counterpart Japanese Patent Application No. 2023-019188.

* cited by examiner

*Primary Examiner* — Kristy A Haupt
(74) *Attorney, Agent, or Firm* — WHDA, LLP

(57) ABSTRACT

Achieved are both high speed in decoding a simple code and stability of decoding of a difficult code. A code image, generated by high-speed imaging control (first imaging control) for causing an imaging unit to generate the code image while causing an illumination unit to execute one type (N1=1) of illumination mode (a polarized illumination mode) among four types of illumination, is decoded by a core (high-speed decoding). On the other hand, a code image, generated by difficult-to-read imaging control (second imaging control) for causing the imaging unit to generate the code image while causing the illumination unit to execute all the four types (N2=4) of illumination modes among the four types of illumination modes, is decoded by a core (difficult-to-read decoding).

15 Claims, 11 Drawing Sheets

| BANK B (1) | STANDARD-RESOLUTION CAMERA 31B | POLARIZED ILLUMINATION | HIGH-SPEED DECODING |
|---|---|---|---|
| BANK B (2) | STANDARD-RESOLUTION CAMERA 31B | DIRECT ILLUMINATION | HIGH-SPEED DECODING |
| BANK B (3) | STANDARD-RESOLUTION CAMERA 31B | PARTIALLY DIFFUSE ILLUMINATION | HIGH-SPEED DECODING |
| BANK B (4) | STANDARD-RESOLUTION CAMERA 31B | ENTIRELY DIFFUSE ILLUMINATION | HIGH-SPEED DECODING |
| BANK B (5) | HIGH-RESOLUTION CAMERA 31A | POLARIZED ILLUMINATION | HIGH-SPEED DECODING |
| BANK B (6) | HIGH-RESOLUTION CAMERA 31A | DIRECT ILLUMINATION | HIGH-SPEED DECODING |
| BANK B (7) | HIGH-RESOLUTION CAMERA 31A | PARTIALLY DIFFUSE ILLUMINATION | HIGH-SPEED DECODING |
| BANK B (8) | HIGH-RESOLUTION CAMERA 31A | ENTIRELY DIFFUSE ILLUMINATION | HIGH-SPEED DECODING |
| BANK B (9) | STANDARD-RESOLUTION CAMERA 31B | POLARIZED ILLUMINATION | DIFFICULT-TO-READ DECODING |
| BANK B (10) | STANDARD-RESOLUTION CAMERA 31B | DIRECT ILLUMINATION | DIFFICULT-TO-READ DECODING |
| BANK B (11) | STANDARD-RESOLUTION CAMERA 31B | PARTIALLY DIFFUSE ILLUMINATION | DIFFICULT-TO-READ DECODING |
| BANK B (12) | STANDARD-RESOLUTION CAMERA 31B | ENTIRELY DIFFUSE ILLUMINATION | DIFFICULT-TO-READ DECODING |
| BANK B (13) | HIGH-RESOLUTION CAMERA 31A | POLARIZED ILLUMINATION | DIFFICULT-TO-READ DECODING |
| BANK B (14) | HIGH-RESOLUTION CAMERA 31A | DIRECT ILLUMINATION | DIFFICULT-TO-READ DECODING |
| BANK B (15) | HIGH-RESOLUTION CAMERA 31A | PARTIALLY DIFFUSE ILLUMINATION | DIFFICULT-TO-READ DECODING |
| BANK B (16) | HIGH-RESOLUTION CAMERA 31A | ENTIRELY DIFFUSE ILLUMINATION | DIFFICULT-TO-READ DECODING |

MOBILE CODE READING DEVICE AND CODE READING METHOD

CROSS-REFERENCE TO RELATED APPLICATIONS

The present application claims foreign priority based on Japanese Patent Application No. 2023-019186, filed Feb. 10, 2023, the contents of which are incorporated herein by reference.

BACKGROUND OF THE INVENTION

1. Technical Field

The invention relates to a technique for generating a code image based on light reflected from a workpiece and decoding the code image to read a code attached to the workpiece.

2. Description of the Related Art

A technique for decoding a code image, generated by capturing an image of a code with a camera, to read the code has been known. At this time, a time required for decoding the code image depends on the type of code. That is, a code that is easy to decode, such as a code printed on a label, can be decoded in a short time, and a code that is difficult to decode, such as a code formed by direct part marking (DPM), requires a long time. On the other hand, U.S. Pat. No. 7,852,519 proposes a technique for improving decoding efficiency by using a first core and a second core. According to this technique, a timeout of decoding in the first core is set shorter than an imaging cycle of a code, and a timeout of decoding in the second core is set longer than an imaging cycle of a code.

As a result, a simple code can be quickly decoded by the first core, and a difficult code can be reliably decoded by the second core with enough time.

However, when a condition for generating a code image is inappropriate, decoding of the code image fails even if decoding has been performed with enough time. In particular, when irradiation of a workpiece with light is inappropriate, a good code image cannot be generated and decoding of the code image fails in many cases. In addition, in an environment where simple codes are more than difficult codes, when an imaging cycle is defined as in U.S. Pat. No. 7,852,519, it is considered that the first core is brought into a standby state until the next imaging cycle even if the first core succeeds in decoding in a time shorter than an interval of the imaging cycle.

SUMMARY OF THE INVENTION

The invention has been made in view of the above problems, and an object thereof is to achieve both high speed in decoding a simple code and stability in decoding a difficult code.

According to one embodiment of the invention, a portable code reading device includes: an illumination unit capable of sequentially executing a plurality of types of illumination modes for irradiating a workpiece, provided with a code to be read, with light in mutually different modes in a switching manner; an imaging unit that receives light emitted from the illumination unit and then reflected by the workpiece to generate a code image; and a control unit that includes a first core and a second core capable of decoding code images in parallel, causes the imaging unit to generate a code image while causing the illumination unit to execute one illumination mode among the plurality of types of illumination modes, and causes the first core or the second core to execute decoding of the generated code image. The control unit executes first imaging control for causing the imaging unit to generate a code image while causing the illumination unit to execute N1 types (N1 is an integer of one or more) of illumination modes among the plurality of types of illumination modes, and a second imaging control for causing the imaging unit to generate a code image while causing the illumination unit to execute N2 types (N2 is an integer larger than N1) of illumination modes among the plurality of types of illumination modes. The first core executes decoding of the code image generated by the first imaging control. The second core executes decoding of the code image generated by the second imaging control in parallel with the decoding by the first core.

According to one embodiment of the invention, a code image reading method is a code reading method for generating a code image by causing an imaging unit to receive light reflected from a workpiece provided with a code to be read while switching an illumination mode executed by an illumination unit capable of executing a plurality of types of illumination modes for irradiating the workpiece with light in mutually different modes, and includes: a step of causing the imaging unit to generate a code image while causing the illumination unit to execute one illumination mode among the plurality of types of illumination modes; and a step of causing a first core or a second core to decode the code image. The first core decodes a code image generated by the imaging unit while the illumination unit executes N1 types (N1 is an integer of one or more) of illumination modes among the plurality of types of illumination modes. The second core decodes a code image generated by the imaging unit while the illumination unit executes N2 types (N2 is an integer larger than N1) of illumination modes among the plurality of types of illumination modes. The decoding by the second core is executed in parallel with the decoding by the first core.

In the invention configured as described above, regarding the first core, switching of the illumination mode is reduced with emphasis on high speed (when N1 is 1, the illumination mode is fixed). On the other hand, regarding the second core, switching of the illumination mode is increased with emphasis on reliable reading. As a result, it is possible to achieve both the high speed in decoding a simple code and the stability in decoding a difficult code.

According to one embodiment of the invention, a code reading device may be a portable code reading device including: an illumination unit that irradiates a workpiece, provided with a code to be read, with light; an imaging unit that receives light emitted from the illumination unit and then reflected by the workpiece to generate a code image; and a control unit that includes a first core, a second core, and a third core which are capable of executing decoding of a code images in parallel, causes the illumination unit to emit light and causes the imaging unit to generate a code image, and causes the first core, the second core, or the third core to execute decoding of the generated code image, and being configured such that a timeout period that can be used by the first core and the second core for decoding is shorter than a timeout period that can be used by the third core for decoding, and the control unit causes the illumination unit to emit light when a difference between a time required for decoding that is being executed by one core out of the first core and the second core and the timeout period for the one core is less than a predetermined time, and causes the imaging unit to generate a code image that is to be decoded by the one core.

In the invention (code reading device) configured as described above, a code image for decoding to be executed next is generated without waiting for a lapse of the timeout period of decoding that is being executed. As a result, it is possible to achieve both the high speed in decoding a simple code and the stability in decoding a difficult code.

In the invention configured as described above, it is possible to achieve both the high speed in decoding a simple code and the stability in decoding a difficult code.

BRIEF DESCRIPTION OF THE DRAWINGS

FIG. 4 is a timing chart illustrating an example of a sequence executed by a plurality of cores;

FIG. 5 is a view schematically illustrating an example of a bank;

DETAILED DESCRIPTION

Figure 1:
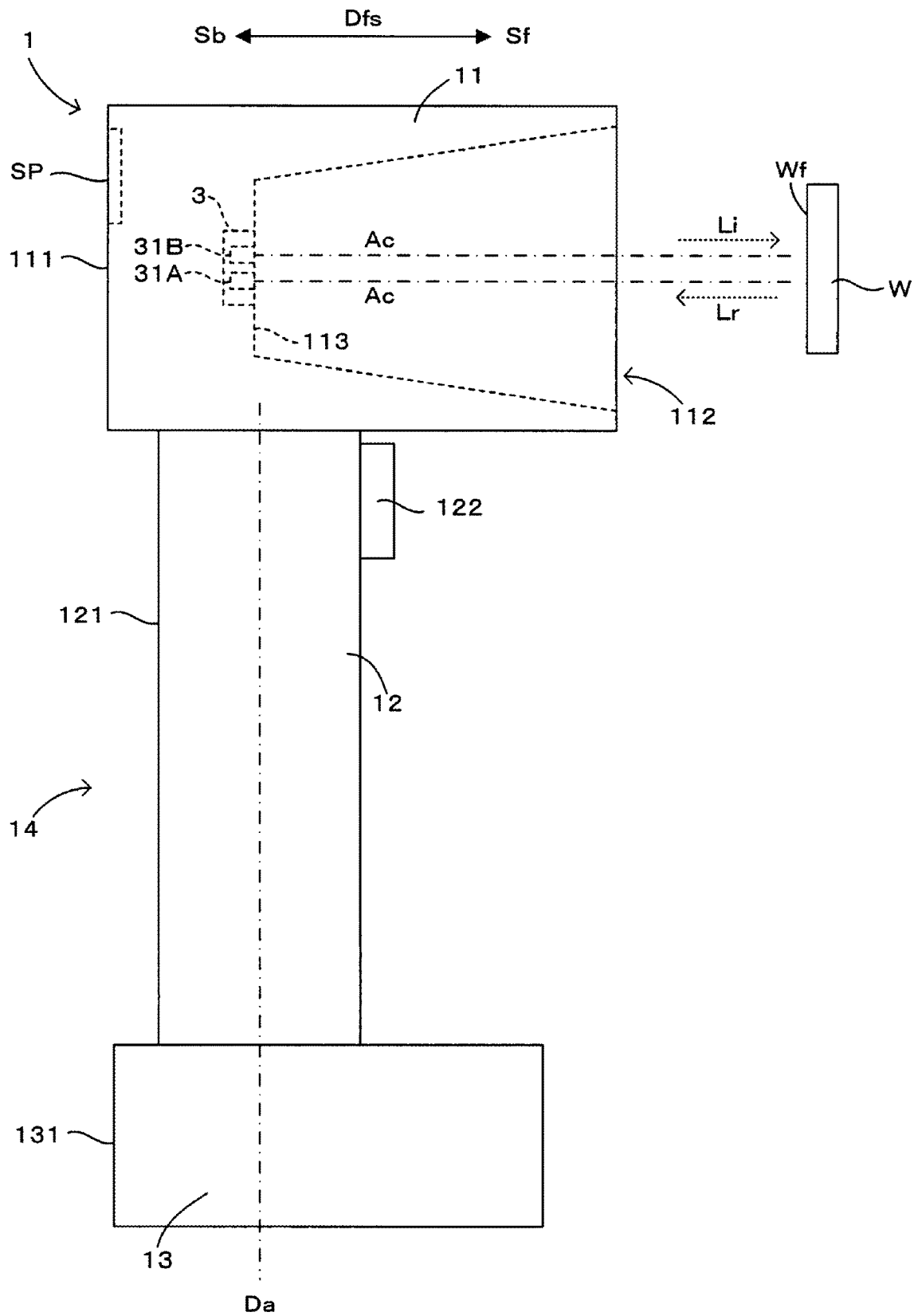
FIG. 1 is a side view schematically illustrating a configuration of a code reading device.
Figure 2:
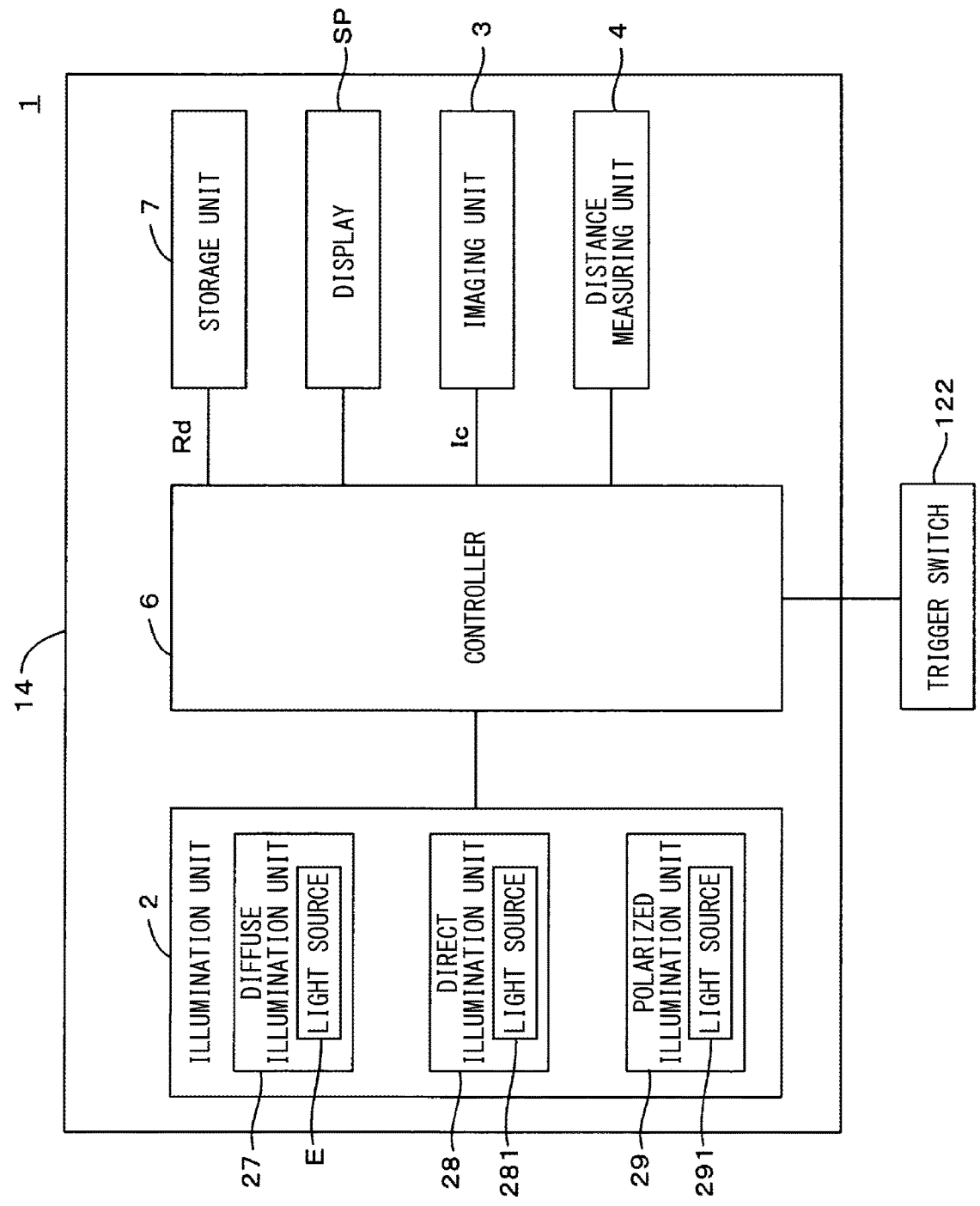
FIG. 2 is a block diagram schematically illustrating an electrical configuration of the code reading device of FIG. 1.

FIG. 1 is a side view schematically illustrating a configuration of a code reading device, and FIG. 2 is a block diagram schematically illustrating an electrical configuration of the code reading device of FIG. 1. Here, in a state where a code reading device 1 faces a surface Wf of a workpiece W in order to read a code attached to the surface Wf of the workpiece W by the code reading device 1, a front-rear direction Dfs is appropriately illustrated with a side closer to the workpiece W with respect to the code reading device 1 as a front side Sf and an opposite side of the workpiece W with respect to the code reading device 1 as a rear side Sb. Note that a portable code reading device is taken as an example in the present embodiment, but a fixed code reading device may be used without being limited to the portable type.

As illustrated in FIG. 1, the code reading device 1 includes a head 11, a grip 12, and a grip end 13. The grip 12 extends in an axial direction Da intersecting the front-rear direction Dfs between the head 11 and the grip end 13. In other words, the head 11 is provided at one end of the grip 12, and the grip end 13 is provided at the other end (end opposite to the one end) of the grip 12. The head 11 has a head body 111, the grip 12 has a grip body 121, the grip end 13 has a grip end body 131, and the head body 111, the grip body 121, and the grip end body 131 constitute a housing 14 that houses each unit incorporated in the code reading device 1. A user can carry the code reading device 1 by grasping the grip body 121 of the code reading device 1.

The head body 111 of the head 11 has an opening 112 opened to the front side Sf, and an arrangement panel 113 is provided at an end on the rear side Sb (in other words, the back side) of the opening 112. During code reading, the opening 112 faces the surface Wf of the workpiece W, and the arrangement panel 113 faces the surface Wf of the workpiece W through the opening 112. In addition, the head 11 includes an illumination unit 2, an imaging unit 3, a distance measuring unit 4, and a display SP illustrated in FIG. 2. The illumination unit 2, the imaging unit 3, the distance measuring unit 4, and the display SP are housed in the head 11. In particular, a part of the illumination unit 2, the imaging unit 3, and the distance measuring unit 4 are provided on the arrangement panel 113.

The illumination unit 2 irradiates the surface Wf of the workpiece W with illumination light Li, and the imaging unit 3 captures an image of reflected light Lr from the surface Wf of the workpiece W with a camera 31A or 31B to generate a code image Ic. The illumination light Li is emitted from the illumination unit 2 to the surface Wf of the workpiece W through the opening 112, the reflected light Lr is generated as the illumination light Li is reflected from the surface Wf of the workpiece W, and the reflected light Lr is incident on the camera 31A or 31B of the imaging unit 3 from the surface Wf of the workpiece W through the opening 112.

The illumination unit 2 includes a diffuse illumination unit 27, a direct illumination unit 28, and a polarized illumination unit 29. The diffuse illumination unit 27 has a light source E, and diffuses light emitted from the light source E and irradiates the surface Wf of the workpiece W with the diffuse light. The direct illumination unit 28 includes a light source 281, and directly irradiates the surface Wf of the workpiece W with light emitted from the light source 281 without diffusing the light. The polarized illumination unit 29 includes a light source 291, polarizes light emitted from the light source 291, and irradiates the surface Wf of the workpiece W with the polarized light. Details of the illumination unit 2 will be described later.

The imaging unit 3 includes two cameras 31A and 31B. Each of the cameras 31A and 31B collects the reflected light Lr on an individual imaging element by a condenser lens which is an objective lens facing the surface Wf of the workpiece W. The individual imaging element receives the reflected light Lr collected by the condenser lens to generate the code image Ic. An optical axis Ac of each of the cameras 31A and 31B (that is, the optical axis Ac of the condenser lens of each of the cameras 31A and 31B) is parallel to the above-described front-rear direction Dfs.

The distance measuring unit 4 measures time until light emitted from the distance measuring unit 4 to the surface Wf of the workpiece W through the opening 112 is reflected by the surface Wf of the workpiece W and returns to the distance measuring unit 4 through the opening 112, thereby measuring a distance to the surface Wf of the workpiece W.

The display SP displays information to the user. In addition, the display SP receives an input operation by the user.

The grip 12 includes a trigger switch 122 provided on the front side Sf of the grip body 121. The user can operate the trigger switch 122 with a finger while gripping the grip body 121 with a hand.

In addition, the code reading device 1 includes a controller 6 that controls each unit of the code reading device 1 and a storage unit 7 that stores data to be used in the code reading device 1 and generated data. The controller 6 and the storage unit 7 are housed in the housing 14. The controller 6 is a processor, that is, a central processing unit (CPU). The storage unit 7 is a storage device such as a read only memory (ROM) or a random access memory (RAM).

The controller 6 causes the illumination unit 2 to execute an illumination operation of irradiating the surface Wf of the workpiece W with the illumination light Li, and causes the imaging unit 3 to execute an imaging operation of receiving the reflected light Lr by the solid-state imaging element to generate the code image Ic. In this manner, "code image generation processing" is executed by the illumination operation by the illumination unit 2 and the imaging operation by the imaging unit 3. Furthermore, the controller 6 decodes the code image Ic generated by the code image generation processing. In this manner, the code reading is executed by a series of operations such as the code image generation processing including the illumination operation by the illumination unit 2 and the imaging operation by the imaging unit 3 and the decoding by the controller 6. For example, the controller 6 executes the code reading when sensing that the trigger switch 122 is operated by the user. A decoding result Rd which is a result of the code reading, that is, a result of the decoding of the code image Ic by the controller 6 is stored in the storage unit 7.

Figure 3:
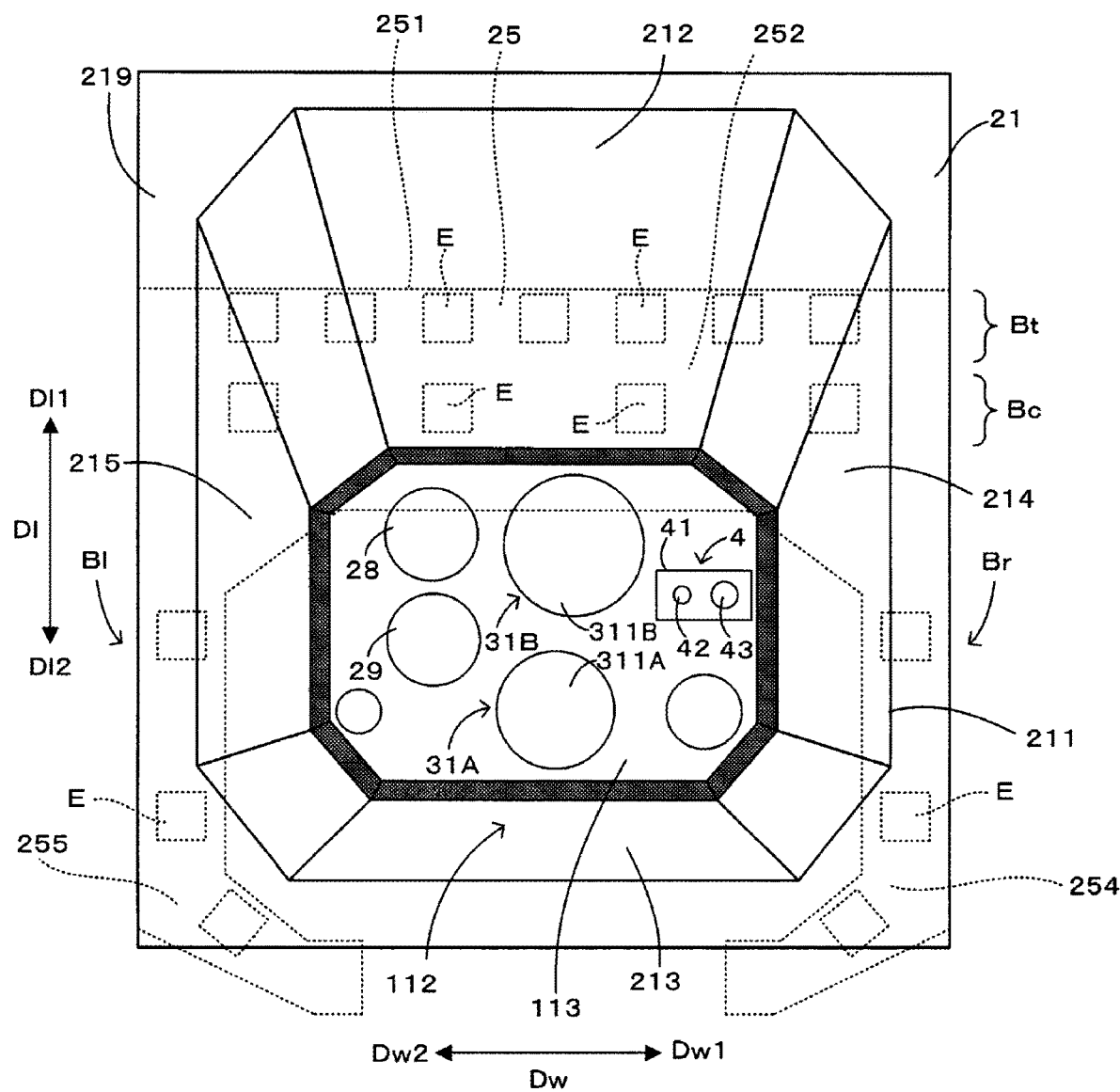
FIG. 3 is a front view schematically illustrating a diffuser provided in a head and an illumination substrate provided on a rear side of the diffuser.

Next, a configuration of the head 11, particularly a configuration of the illumination unit 2 provided in the head 11 will be described in detail. FIG. 3 is a front view schematically illustrating a diffuser provided in the head and an illumination substrate provided on the rear side of the diffuser. In FIG. 3, a length direction Dl and a width direction Dw are illustrated. Here, the length direction Dl and the width direction Dw are orthogonal to each other and are orthogonal to the front-rear direction Dfs. In addition, one side Dl1 in the length direction Dl (a side from the grip end 13 toward the head 11) and the other side Dl2 in the length direction Dl (a side opposite to the one side Dl1) are illustrated, and one side Dw1 in the width direction Dw and the other side Dw2 in the width direction Dw (a side opposite to the one side Dw1) are illustrated.

The illumination unit 2 includes a diffuser 21 and an illumination substrate 25 arranged on the rear side Sb of the diffuser 21 in the front-rear direction Dfs. The diffuser 21 forms a part of the head body 111 described above. Note that the illumination substrate 25 hidden by the diffuser 21 in the front view from the front side Sf in the front-rear direction Dfs is indicated by a broken line in FIG. 3.

The diffuser 21 has an opening defining portion 211 which is a wall surface surrounding the above-described opening 112 opened to the front side Sf. The opening defining portion 211 has a top diffusion plate 212 provided on the one side Dl1 of the opening 112 and a bottom plate 213 provided on the other side Dl2 of the opening 112 in the length direction Dl. Furthermore, the opening defining portion 211 includes a right diffusion plate 214 provided on the one side Dl1 of the opening 112 and a left diffusion plate 215 provided on the other side Dl2 of the opening 112 in the width direction Dw. End portions of the top diffusion plate 212 on both the sides in the width direction Dw are bent to the other side Dl2 toward the right diffusion plate 214 and the left diffusion plate 215. In addition, in the length direction Dl, an end portion of the right diffusion plate 214 on the other side Dl2 is bent to the other side Dw2 toward the bottom plate 213, and an end portion of the left diffusion plate 215 on the other side Dl2 is bent to the one side Dw1 toward the bottom plate 213.

The top diffusion plate 212, the right diffusion plate 214, and the left diffusion plate 215 diffuse light transmitted from the rear side Sb to the front side Sf, and emit the light to the front side Sf. Specifically, a back surface (light incident surface) on the rear side Sb of each of the top diffusion plate 212, the right diffusion plate 214, and the left diffusion plate 215 is roughened, and the light is diffused by the textured back surface. However, a configuration for causing the top diffusion plate 212, the right diffusion plate 214, and the left diffusion plate 215 to have a light diffusion function is not limited to roughening, and for example, the light diffusion function may be provided by processing these plates into milky white.

Each of the plates 212, 213, 214, and 215 defining the opening 112 has a tapered shape inclined with respect to the front-rear direction Dfs such that the area of the opening 112 in a cross section orthogonal to the optical axis Ac of the condenser lens 311A (FIG. 1) of the camera 31A increases toward the front side Sf in the front-rear direction Dfs. In other words, each of the plates 212, 213, 214, and 215 has a tapered shape inclined with respect to the front-rear direction Dfs so as to be separated from the optical axis Ac toward the front side Sf in the front-rear direction Dfs (an optical axis direction).

The illumination substrate 25 is arranged on the rear side Sb with respect to the plates 212, 213, 214, and 215 each having the tapered shape as described above. The illumination substrate 25 includes a substrate 251 and a plurality of light sources E arrayed on a surface of the substrate 251 on the front side Sf. The substrate 251 includes a main substrate portion 252 extending in the width direction Dw, a right substrate portion 254 extending from an end portion of the main substrate portion 252 on the one side Dw1 to the other side Dl2 in the length direction Dl, and a left substrate portion 255 extending from an end portion of the main substrate portion 252 on the other side Dw2 to the other side Dl2 in the length direction Dl.

The main substrate portion 252 is provided with a top light source region Bt provided with a predetermined width in the width direction Dw and a center light source region Bc provided with a predetermined width in the width direction Dw on the other side Dl2 of the length direction Dl with respect to the top light source region Bt. A plurality of light sources E are arrayed in the width direction Dw at a predetermined pitch (top pitch) in the top light source region Bt, and a plurality of light sources E are arrayed in the width direction Dw at a center pitch, longer than the top pitch, in the center light source region Bc. Due to such a difference between the pitches, the number of the light sources E arrayed in the top light source region Bt is larger than the number of the light sources E arrayed in the center light source region Bc. The center pitch is twice the top pitch in this example, but a specific ratio of these pitches is not limited thereto.

An end portion of the right substrate portion 254 on the other side Dl2 is bent to the other side Dw2 in the width direction Dw. In addition, the right substrate portion 254 is provided with a right light source region Br along a shape of the right substrate portion 254, and a plurality of light sources E are arrayed in the right light source region Br. The number of the light sources E arrayed in the right light source region Br is smaller than the number of the light sources E arrayed in the top light source region Bt, and is smaller than the number of the light sources E arrayed in the center light source region Bc.

An end portion of the left substrate portion 255 on the other side Dl2 is bent to the one side Dw1 in the width direction Dw. In addition, the left substrate portion 255 is provided with a left light source region Bl along a shape of the left substrate portion 255, and a plurality of light sources E are arrayed in the left light source region Bl. The number of the light sources E arrayed in the left light source region Bl is equal to the number of the light sources E arrayed in the right light source region Br.

The light source E is, for example, a light emitting diode (LED), and emits light to the front side Sf toward the top diffusion plate 212, the right diffusion plate 214, or the left diffusion plate 215. The light emitted from the light source E and incident on the top diffusion plate 212, the right diffusion plate 214, or the left diffusion plate 215 from the rear side Sb is diffused as passing through the diffusion plate 212, 214, or 215, and is emitted from the diffusion plate 212, 214, or 215 to the front side Sf.

The light emitted from the light source E in the top light source region Bt is mainly diffused by the top diffusion plate 212, and then emitted as the illumination light Li from the top diffusion plate 212 toward the surface Wf of the workpiece W. The light emitted from the light source E in the center light source region Bc is mainly diffused by the top diffusion plate 212, and then emitted as the illumination light Li from the top diffusion plate 212 toward the surface Wf of the workpiece W. The light emitted from the light source E in the right light source region Br is mainly diffused by the right diffusion plate 214, and then emitted as the illumination light Li from the right diffusion plate 214 toward the surface Wf of the workpiece W. The light emitted from the light source E in the left light source region Bl is mainly diffused by the left diffusion plate 215, and then emitted as the illumination light Li from the left diffusion plate 215 toward the surface Wf of the workpiece W. In this manner, the light from the light source E is diffused by the diffuser 21 as passing through the diffuser 21. In addition, the surface Wf of the workpiece W is irradiated with diffuse light, generated by diffusing the light by the diffuser 21, as uniform planar illumination light Li.

As described above, the top light source region Bt, the center light source region Bc, the right light source region Br, and the left light source region Bl of the diffuser 21 generate beams of the illumination light Li emitted from the diffuser 21 toward the surface Wf of the workpiece W at mutually different angles. On the other hand, the controller 6 that controls the illumination unit 2 can change a lighting region in which light is emitted from the light source E among the top light source region Bt, the center light source region Bc, the right light source region Br, and the left light source region Bl. When the lighting region is changed this manner, it is possible to change an angle at which the diffuse light is made incident on the surface Wf of the workpiece W as the illumination light Li.

The above-described diffuse illumination unit 27 (FIG. 2) is configured using the diffuser 21, a reflector 23, and the illumination substrate 25 as described above. Furthermore, as described above, the illumination unit 2 includes the direct illumination unit 28 that directly irradiates the surface Wf of the workpiece W with the light from the light source 281 without diffusing the light, and the polarized illumination unit 29 that irradiates the surface Wf of the workpiece W with polarized light (P waves or S waves) obtained by polarizing the light from the light source 291. As illustrated in FIG. 3, the direct illumination unit 28 and the polarized illumination unit 29 are arranged on the arrangement panel 113.

Therefore, the controller 6 can selectively execute a "diffuse illumination mode" in which the workpiece W is irradiated with a diffuse illumination generated by turning on the light source E of the diffuse illumination unit 27, a "direct illumination mode" in which the workpiece W is irradiated with direct illumination generated by turning on the light source 281 of the direct illumination unit 28, and a "polarized illumination mode" in which the workpiece W is irradiated with polarized illumination generated by turning on the light source 291 of the polarized illumination unit 29.

In particular, regarding the "diffuse illumination mode", it is possible to execute a plurality of diffuse illumination modes in which combinations of lighting regions in which light is emitted from the light source E are different from each other among the top light source region Bt, the center light source region Bc, the right light source region Br, and the left light source region Bl that irradiate the surface Wf of the workpiece W with beams of diffuse light at mutually different irradiation angles. For example, the plurality of diffuse illumination modes include a "partially diffuse illumination mode" in which the workpiece W is irradiated with partially diffuse illumination generated by emitting light from the light sources E only in the top light source region Bt and the center light source region Bc among the top light source region Bt, the center light source region Bc, the right light source region Br, and the left light source region Bl, and an "entirely diffuse illumination mode" in which the workpiece W is irradiated with entirely diffuse illumination (dome illumination) generated by emitting light from all the light sources E in the top light source region Bt, the center light source region Bc, the right light source region Br, and the left light source region Bl.

As described above, the imaging unit 3 includes the two cameras 31A and 31B, and these cameras 31A and 31B are provided on the arrangement panel 113. Specifically, as illustrated in FIG. 3, the condenser lens 311A and a condenser lens 311B (objective lenses) of the camera 31A and the camera 31B are fitted into the arrangement panel 113. The camera 31A collects the reflected light Lr from the surface Wf of the workpiece W on a solid-state imaging element by the condenser lens 311A, and causes the solid-state imaging element to generate the code image Ic. Similarly, the camera 31B collects the reflected light Lr from the surface Wf of the workpiece W on a solid-state imaging element by the condenser lens 311B, and causes the solid-state imaging element to generate the code image Ic. The camera 31A is a high-resolution camera, whereas the camera 31B is a standard-resolution camera, and the resolution of the camera 31A is higher than the resolution of the camera 31B. Therefore, the resolution of the code image Ic captured by the camera 31A is higher than the resolution of the code image Ic captured by the camera 31B. For example, in a case where image sensors included in the respective cameras have the equal number of pixels, the resolution of the camera 31A can be made higher than the resolution of the camera 31B by making a visual field of the camera 31A narrower than a visual field of the camera 31B.

In addition, the distance measuring unit 4 is provided on the arrangement panel 113. The distance measuring unit 4 includes a distance sensor 41 that is a time of flight (TOF) camera, and the distance sensor 41 includes a light emitting unit 42 that emits light toward the visual fields of the cameras 31A and 31B and a light receiving unit 43 that detects light returned from the visual fields of the cameras 31A and 31B, and measures a distance to an object (including the workpiece W) present in the visual fields of the cameras 31A and 31B based on a time from the emission of light from the light emitting unit 42 to reception of the light of the light receiving unit 43.

Meanwhile, as described above, the code reading is executed by a series of operations such as the code image generation processing including the illumination operation by the illumination unit 2 and the imaging operation by the imaging unit 3 and the decoding by the controller 6. In addition, the controller 6 includes a plurality of cores C0 to C4 (FIG. 4) each of which is a processor capable of executing computation. Among the plurality of cores C0 to C4, the core C0 controls the illumination unit 2 and the imaging unit 3 to cause the illumination unit 2 and the imaging unit 3 to execute the code image generation processing for generating the code image Ic. In addition, the cores C1 to C4 decode the code image Ic generated by the code image generation processing.

The cores C1 to C4 can execute the decoding in parallel (that is, can execute parallel processing). The core C1 executes image processing (high-speed decoding) for decoding a code that is easy to decode at high speed, and the cores C2 to C4 execute image processing (difficult-to-read decoding) for decoding a code that is difficult to decode. The amount of computation required for the core C1 to execute the high-speed decoding is smaller than the amount of computation required for each of the cores C2 to C4 to execute the difficult-to-read decoding, and a time required for the core C1 to execute the high-speed decoding is shorter than a time required for each of the cores C2 to C4 to execute the difficult-to-read decoding. In particular, the difficult-to-read decoding executed by the cores C2 to C4 executes image processing using a machine learning model (for example, a deep learning model). This machine learning model has been learned to repair a portion that is inappropriate for decoding and included in the code image Ic. Therefore, in the difficult-to-read decoding, image processing using the machine learning model is executed, and decoding is executed on the code image Ic on which the image processing has been executed. On the other hand, the high-speed decoding executed by the core C1 executes decoding of the code image Ic without executing the image processing using the machine learning model.

Figure 4:
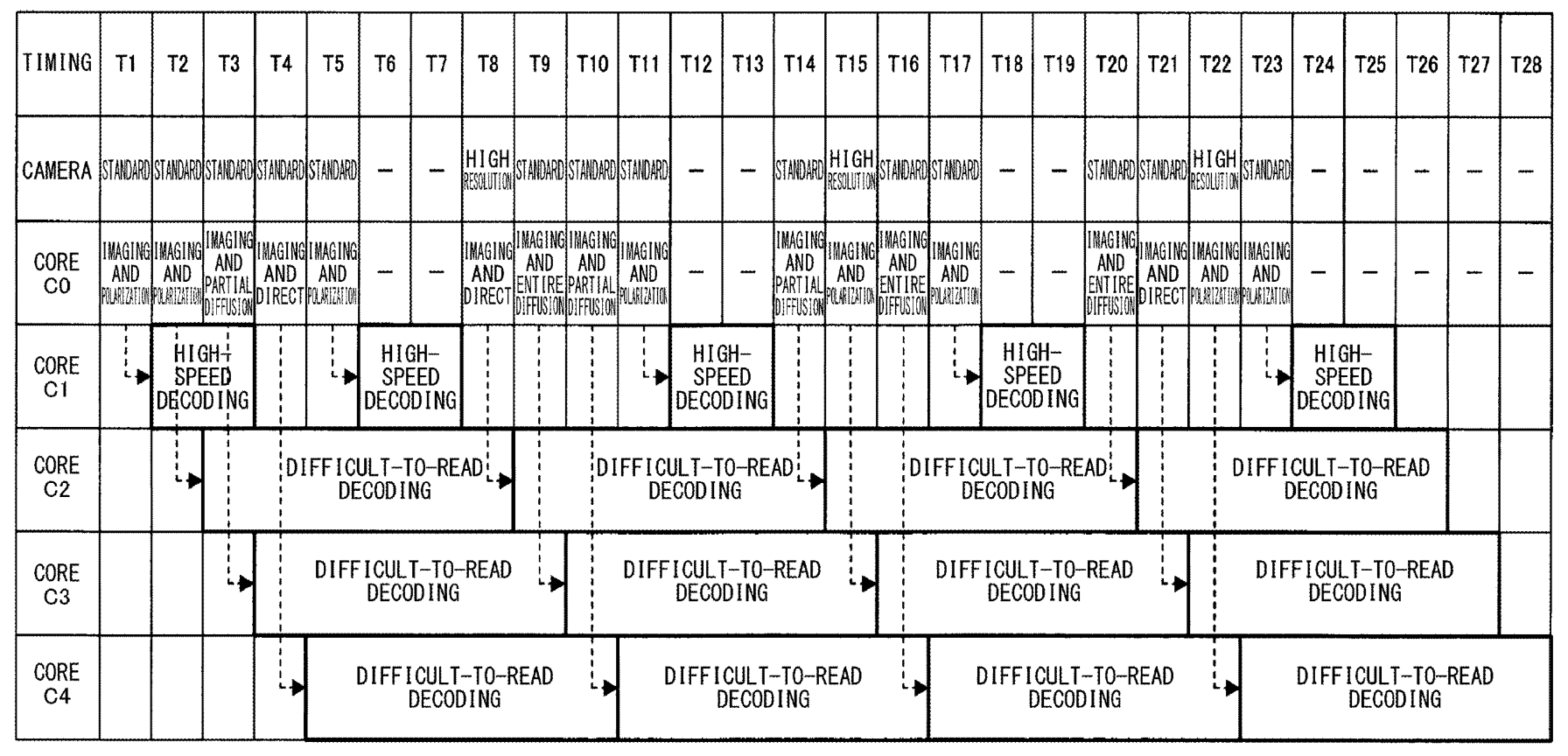

FIG. 4 is a timing chart illustrating an example of a sequence executed by the plurality of cores. In this drawing, a row of "timing" indicates the passage of time in the order of timings T1 to T28. A row of "camera" indicates a type of camera used in the imaging operation of the code image generation processing, "standard" indicates the standard-resolution camera 31B, and "high resolution" indicates the high-resolution camera 31A. A row of "core C0" indicates a content of control executed by the core C0 with respect to the illumination unit 2 and the imaging unit 3, "imaging and polarization" indicates control for causing the imaging unit 3 to execute an imaging operation while causing the illumination unit 2 to execute an illumination operation in the polarized illumination mode, "imaging and direct" indicates control for causing the imaging unit 3 to execute an imaging operation while causing the illumination unit 2 to execute an illumination operation in the direct illumination mode, "imaging and partial diffusion" indicates control for causing the imaging unit 3 to execute an imaging operation while causing the illumination unit 2 to execute an illumination operation in the partially diffuse illumination mode, and "imaging and entire diffusion" indicates control for causing the imaging unit 3 to execute an imaging operation while causing the illumination unit 2 to execute an illumination operation in the entirely diffuse illumination mode. Furthermore, rows of "core C1" to "core C4" indicate types of decoding executed by the cores C1 to C4, respectively.

When the core C0 executes code image generation processing by "imaging and polarization" using the standard-resolution camera 31B at the timing T1 to generate the code image Ic, the core C1 executes the high-speed decoding on the code image Ic at the timings T2 to T3 following the timing T1.

When the core C0 executes the code image generation processing by the "imaging and polarization" using the standard-resolution camera 31B at the timing T2 to generate the code image Ic, the core C2 executes the difficult-to-read decoding on the code image Ic at the timings T3 to T8 following the timing T2.

When the core C0 executes the code image generation processing by "imaging and partial diffusion" using the standard-resolution camera 31B at the timing T3 to generate the code image Ic, the core C3 executes the difficult-to-read decoding on the code image Ic at the timings T4 to T9 following the timing T3.

When the core C0 executes the code image generation processing by "imaging and direct" using the standard-resolution camera 31B at the timing T4 to generate the code image Ic, the core C3 executes the difficult-to-read decoding on the code image Ic at timings T5 to T10 following the timing T4.

When the core C0 executes the code image generation processing by "imaging and polarization" using the standard-resolution camera 31B at the timing T5 to generate the code image Ic, the core C1 executes the high-speed decoding on the code image Ic at the timings T6 to T7 following the timing T5.

When the core C0 executes the code image generation processing by "imaging and direct" using the high-resolution camera 31A at the timing T8 to generate the code image Ic, the core C2 executes the difficult-to-read decoding on the code image Ic at the timings T9 to T14 following the timing T8.

When the core C0 executes the code image generation processing by "imaging and entire diffusion" using the standard-resolution camera 31B at the timing T9 to generate the code image Ic, the core C3 executes the difficult-to-read decoding on the code image Ic at the timings T10 to T15 following the timing T9.

When the core C0 executes the code image generation processing by "imaging and partial diffusion" using the standard-resolution camera 31B at the timing T10 to generate the code image Ic, the core C4 executes the difficult-to-read decoding on the code image Ic at the timings T11 to T16 following the timing T10.

When the core C0 executes the code image generation processing by "imaging and polarization" using the standard-resolution camera 31B at the timing T11 to generate the code image Ic, the core C1 executes the high-speed decoding on the code image Ic at the timings T12 to T13 following the timing T11.

When the core C0 executes the code image generation processing by "imaging and partial diffusion" using the standard-resolution camera 31B at the timing T14 to generate the code image Ic, the core C2 executes the difficult-to-read decoding on the code image Ic at the timings T15 to T20 following the timing T14.

When the core C0 executes the code image generation processing by "imaging and polarization" using the high-resolution camera 31A at the timing T15 to generate the code image Ic, the core C3 executes the difficult-to-read decoding on the code image Ic at the timings T16 to T21 following the timing T15.

When the core C0 executes the code image generation processing by "imaging and entire diffusion" using the standard-resolution camera 31B at the timing T16 to generate the code image Ic, the core C4 executes the difficult-to-read decoding on the code image Ic at the timings T17 to T22 following the timing T16.

When the core C0 executes the code image generation processing by "imaging and polarization" using the standard-resolution camera 31B at the timing T17 to generate the code image Ic, the core C1 executes the high-speed decoding on the code image Ic at the timings T18 to T19 following the timing T17.

When the core C0 executes the code image generation processing by "imaging and entire diffusion" using the standard-resolution camera 31B at the timing T20 to generate the code image Ic, the core C2 executes the difficult-to-read decoding on the code image Ic at the timings T21 to T26 following the timing T20.

When the core C0 executes the code image generation processing by "imaging and direct" using the standard-resolution camera 31B at the timing T21 to generate the code image Ic, the core C3 executes the difficult-to-read decoding on the code image Ic at the timings T22 to T27 following the timing T21.

When the core C0 executes the code image generation processing by "imaging and polarization" using the high-resolution camera 31A at the timing T22 to generate the code image Ic, the core C4 executes the difficult-to-read decoding on the code image Ic at the timings T23 to T28 following the timing T22.

When the core C0 executes the code image generation processing by "imaging and polarization" using the standard-resolution camera 31B at the timing T23 to generate the code image Ic, the core C1 executes the high-speed decoding on the code image Ic at the timings T24 to T25 following the timing T23.

Note that the sequence of FIG. 4 ends when any of the cores C1 to C4 succeeds in decoding, that is, succeeds in code reading. Therefore, not all operations illustrated in FIG. 4 are always performed.

In the embodiment described above, four types of illumination modes (the direct illumination mode, the polarized illumination mode, the partially diffuse illumination mode, and the entirely diffuse illumination mode) for irradiating the workpiece W, provided with a code to be read, with light in mutually different modes can be executed. In addition, the code image generation processing of causing the imaging unit 3 to generate a code image while causing the illumination unit 2 to execute one illumination mode among the plurality of types of illumination modes is executed, and the decoding of the code image Ic generated in the completed code image generation processing is executed each time the code image generation processing is completed. In particular, the core C1 (a first core) and the cores C2 to C4 (a second core) are provided, and these are selectively used as follows.

The code image Ic generated by high-speed imaging control (first imaging control) of executing the code image generation processing while causing the illumination unit 2 to execute one type (N1=1) of illumination mode (the polarized illumination mode) among the four types of illumination modes is decoded by the core C1 (the high-speed decoding). On the other hand, the code image Ic generated by difficult-to-read imaging control (second imaging control) of executing the code image generation processing by causing the illumination unit 2 to execute all four types (N2=4) of illumination modes among the four types of illumination modes is decoded by the cores C2 to C4 (the difficult-to-read decoding). That is, the core C1 decodes the code image Ic generated by executing one type of illumination mode, and the cores C2 to C4 decode the code image Ic generated by switching and executing the four types of illumination modes. As described above, regarding the core C1, switching of the illumination mode is reduced with emphasis on high speed (here, the illumination mode is fixed). On the other hand, regarding the cores C2 to C4, switching of the illumination mode is increased with emphasis on reliable reading. As a result, it is possible to improve a success rate in decoding a difficult code while maintaining the high speed in decoding a simple code.

In addition, the illumination unit 2 includes diffuse illumination for irradiating the workpiece W with diffuse light obtained by diffusing light emitted from the light source E by the diffuser 21, and non-diffuse illumination (the direct illumination and the polarized illumination) for irradiating the workpiece with light emitted from the light source E without the diffusion by the diffuser 21. Further, the four types of illumination modes executed in the difficult-to-read imaging control include an illumination mode (the diffuse illumination modes) in which light is emitted by the diffuse illumination and an illumination mode (the direct illumination mode and the polarized illumination mode) in which light is emitted by the non-diffuse illumination. It is possible to generate the good code image Ic with appropriate illumination and improve the success rate in decoding by generating the code image Ic while switching between the diffuse illumination and the non-diffuse illumination and decoding the code image Ic as described above. In addition, an illumination mode executed in the difficult-to-read imaging control (second imaging control) is not limited to the switching between the diffuse illumination and the non-diffuse illumination exemplified above. That is, in the difficult-to-read imaging control, at least one of illumination modes in which light is emitted by, for example, the diffuse illumination, the polarized illumination, ring illumination, or low-angle illumination may be included as illumination considered to be suitable for a difficult-to-read code. The ring illumination and the low-angle illumination are also referred to as dark-field illumination. In the present embodiment, for example, the dark-field illumination can be realized by providing the ring illumination (the low-angle illumination) surrounding the opening defining portion 211 in the vicinity of the opening 112 of the head 11 and irradiating the workpiece W with light obliquely. In addition, diffuse illumination in which light is diffused by a reflective diffuser may be used in addition to the diffuse illumination in which light from a light source is diffused by a transmissive diffuser as in the present embodiment.

As described above, the code image generation processing of generating the code image Ic decoded by the core C1 (the first core) is executed a plurality of times in the high-speed imaging control. On the other hand, in the difficult-to-read imaging control, the code image generation processing of generating the code image Ic to be decoded by the core C2 (the second core) is executed a plurality of times while switching the illumination mode. At this time, light by the non-diffuse illumination (the polarized illumination) is emitted in one type of illumination mode executed in the high-speed imaging control. Further, while the core C2 decodes the code image Ic generated based on the diffuse illumination and decodes the code image Ic generated based on the non-diffuse illumination, the core C1 decodes a plurality of the code images Ic generated based on the non-diffuse illumination. For example, the core C1 executes the decoding of the plurality of code images Ic generated based on the polarized illumination (the non-diffuse illumination) (at the timings T12 to T13 and T18 to T19) in a period (T9 to T14) in which the core C2 executes the difficult-to-read decoding of the code image Ic generated based on the direct illumination (the non-diffuse illumination) at the timings T9 to T20 and the difficult-to-read decoding of the code image Ic generated based on the diffuse illumination at the timings T15 to T20. In such a configuration, the core C1 is made to decode the code image generated by emitting light using the non-diffuse illumination, and the core C2 is made to decode the respective code images generated by emitting light while switching between the non-diffuse illumination and the diffuse illumination. As a result, in a case where a target to be read is a simple code, decoding can be performed at high speed by the core C1 for the high-speed decoding. On the other hand, in a case where a target to be read is a difficult-to-read code, there is a high possibility that a code image good enough to decode the difficult-to-read code is generated among a plurality of code images generated by a plurality of types of illumination, and as a result, there is a high possibility that the difficult-to-read code can be decoded. Moreover, while the core C2 decodes the code image Ic generated based on the diffuse illumination and decodes the code image Ic generated based on the non-diffuse illumination, the core C1 decodes the plurality of code images Ic generated based on the non-diffuse illumination. This makes it possible to improve the success rate in decoding a difficult code while maintaining the high speed in decoding a simple code.

In addition, the diffuse illumination unit 27 of the illumination unit 2 can irradiate the workpiece W with light from a plurality of irradiation angles different from each other by the diffuse illumination, and can irradiate the workpiece W with light in each of the plurality of diffuse illumination modes (the partially diffuse illumination mode and the entirely diffuse illumination mode) in which combinations of irradiation angles at which light is emitted among the plurality of irradiation angles are different from each other. Further, while the core C1 (the first core) decodes the plurality of code images Ic generated based on the non-diffuse illumination (the polarized illumination), the core C4 (the second core) decodes a plurality of the code images Ic generated based on the plurality of diffuse illumination modes and decodes the code image Ic generated based on the non-diffuse illumination. For example, in a period (T2 to T25) in which the core C1 executes the decoding of the plurality of code images Ic generated based on the polarized illumination, the core C4 executes the decoding (T5 to T10) of the code image Ic generated based on the direct illumination (the non-diffuse illumination) and the decoding (T11 to T16 and T17 to T22) of the plurality of code images Ic generated based on the plurality of diffuse illumination modes (the partially diffuse illumination mode and the entirely diffuse illumination mode). In such a configuration, not only the non-diffuse illumination and the diffuse illumination are switched, but also angles of the diffuse illumination are switched, and thus, it is possible to further improve the success rate in decoding a difficult code.

In addition, while the core C2 (second core) decodes the code image Ic generated based on one of the non-diffuse illumination and the diffuse illumination, the core C3 (third core) decodes the code image Ic generated based on the other of the non-diffuse illumination and the diffuse illumination different from the one of the non-diffuse illumination and the diffuse illumination. For example, the core C3 decodes the code image Ic generated based on the diffuse illumination (T10 to T15) in parallel to a period (T9 to T14) in which the core C2 decodes the code image Ic generated based on the direct illumination (the non-diffuse illumination). Alternatively, the core C3 decodes the code image Ic generated based on the polarized illumination (the non-diffuse illumination) (T16 to T21) in parallel to a period (T15 to T20) in which the core C2 decodes the code image Ic generated based on the diffuse illumination. In such a configuration, the decoding by the core C2 on the code image Ic generated based on one of the non-diffuse illumination and the diffuse illumination and the decoding by the core C3 on the code image Ic generated based on the other of the non-diffuse illumination and the diffuse illumination can be executed in parallel. As a result, it is possible to reliably read a difficult code at high speed.

In addition, the core C2 (the second core), the core C3 (a third core), and the core C4 (a fourth core) decode the code images Ic generated based on mutually different types of illumination among the non-diffuse illumination (the direct illumination or the polarized illumination), the partially diffuse illumination (first diffuse illumination), and the entirely diffuse illumination (second diffuse illumination). For example, at the timings T11 to T14, the core C2 executes decoding of the code image Ic generated by the direct illumination, the core C3 executes decoding of the code image Ic generated by the entirely diffuse illumination, and the core C4 executes decoding of the code image Ic generated by the partially diffuse illumination. In such a configuration, the core C2, the core C3, and the core C4 can decode the code images Ic generated based on mutually different types of illumination among the non-diffuse illumination (the direct illumination or the polarized illumination), the partially diffuse illumination, and the entirely diffuse illumination in parallel. That is, the core C2, the core C3, and the core C4 can decode, in parallel, three types of the code images Ic generated not only by making the non-diffuse illumination and the diffuse illumination different but also by making the angles of the diffuse illumination different. As a result, it is possible to reliably read a difficult code at high speed.

In addition, the imaging unit 3 includes the camera 31B (a first camera) and the camera 31A (a second camera) having higher resolution than the camera 31B. Then, only the camera 31B out of the camera 31A and the camera 31B is used to generate the code image Ic in the high-speed imaging control (first imaging control) in which the code image generation processing of generating the code image Ic to be decoded by the core C1 (the first core) is executed a plurality of times. On the other hand, both the camera 31A and the camera 31B are used to generate the code images Ic by switching a camera to be used to generate the code image Ic between the camera 31A and the camera 31B in the difficult-to-read imaging control (second imaging control) in which the code image generation processing of generating the code image Ic to be decoded by the core C2 (the second core) is executed a plurality of times while switching the illumination mode. In such a configuration, the code image Ic is generated by the standard-resolution camera 31B (having a wide visual field) for a code having a standard cell size, and the code image Ic is decoded. On the other hand, the code image Ic is generated by the high-resolution camera 31A for a code having a small cell size (that is relatively difficult to read), so that the success rate in decoding the code image Ic can be improved. As a result, it is possible to achieve both the high speed in decoding a simple code and the stability in decoding a difficult code.

In addition, the core C2 and the core C3 decode, in parallel, the code images Ic generated based on mutually different generation conditions among a plurality of generation conditions in which combinations of one illumination out of the diffuse illumination and the non-diffuse illumination and one camera out of the camera 31A and the camera 31B are different from each other. For example, at the timings T10 to T14, the decoding by the core C2 with respect to the code image Ic generated based on the high-resolution camera 31A and the direct illumination (the non-diffuse illumination) and the decoding by the core C3 with respect to the code image Ic generated based on the standard-resolution camera 31B and the diffuse illumination are executed in parallel. In addition, at the timings T16 to T20, the decoding by the core C2 with respect to the code image Ic generated based on the standard-resolution camera 31B and the diffuse illumination and the decoding by the core C3 with respect to the code image Ic generated based on the high-resolution camera 31A and the polarized illumination (the non-diffuse illumination) are executed in parallel. In such a configuration, the core C2 and the core C3 decodes the code images Ic generated based on the mutually different generation conditions in parallel. As a result, it is possible to reliably read a difficult code at high speed.

In addition, the core C2 (the second core), the core C3 (the third core), and the core C4 (the fourth core) decodes, in parallel, the code images Ic generated based on mutually different generation conditions among a plurality of generation conditions in which combinations of one illumination out of the partially diffuse illumination (the first diffuse illumination), the entirely diffuse illumination (the second diffuse illumination), and the non-diffuse illumination and one camera out of the camera 31A and the camera 31B are different from each other. For example, at timings T11 to T14, the decoding by the core C2 with respect to the code image Ic generated based on the high-resolution camera 31A and the direct illumination, the decoding by the core C3 with respect to the code image Ic generated based on the standard-resolution camera 31B and the entirely diffuse illumination, and the decoding by the core C4 with respect to the code image Ic generated based on the standard-resolution camera 31B and the partially diffuse illumination are executed in parallel. In addition, at the timings T17 to T20, the decoding by the core C2 with respect to the code image IC generated based on the standard-resolution camera 31B and the partially diffuse illumination, the decoding by the core C3 with respect to the code image Ic generated based on the high-resolution camera 31A and the polarized illumination, and the decoding by the core C4 with respect to the code image Ic generated based on the standard-resolution camera 31B and the entirely diffuse illumination are executed in parallel. In such a configuration, the core C2, the core C3, and the core C4 decodes the code images Ic generated based on the mutually different generation conditions in parallel. As a result, it is possible to reliably read a difficult code at high speed.

In addition, the core C2 executes image processing using a machine learning model learned to repair a portion that is inappropriate for decoding and included in the code image Ic generated by the imaging unit 3, and executes decoding of the code image Ic on which the image processing has been executed. On the other hand, the core C1 executes decoding of the code image Ic without executing the image processing using the machine learning model. In such a configuration, the machine learning model is used only for decoding a difficult code, and the machine learning model is not used for decoding a simple code. This makes it possible to improve the success rate in decoding a difficult code while maintaining the high speed in decoding a simple code.

In addition, the illumination unit 2 includes the diffuse illumination unit 27 that irradiates the workpiece with the diffuse light obtained by diffusing the light emitted from the plurality of light sources E by the diffuser 21, and can change an angle at which the workpiece W is irradiated with the diffuse light by changing the light source E that emits the light among the plurality of light sources E (FIGS. 2 and 3). In such a configuration, it is possible to perform irradiation with the diffuse illumination from an appropriate angle, and to improve the success rate in decoding a difficult code.

Meanwhile, the code reading is repeatedly executed while switching a combination of a camera, illumination, and decoding in the above embodiment. That is, one camera to be used is switched between the high-resolution camera 31A and the standard-resolution camera 31B, one illumination to be used is switched among the polarized illumination, the direct illumination, the partially diffuse illumination, and the entirely diffuse illumination, and one decoding to be used is switched between the high-speed decoding and the difficult-to-read decoding. That is, the controller 6 including the cores C0 to C4 repeatedly executes code reading while switching the combination of the camera, the illumination, and the decoding to be used in the code reading. At this time, the controller 6 can easily switch the combination by control using a bank to be described next.

FIG. 5 is a view schematically illustrating an example of the bank. That is, the core C0 can store a plurality of banks B(N) in the storage unit 7 (N=1, 2, 3, and so on). The bank B indicates a combination of a camera, illumination and decoding to be used in code reading, and the plurality of banks B(N) indicate mutually different combinations, respectively. For example, by selecting a bank B(1), the controller 6 can execute code reading according to a combination indicated by the bank B(1), that is, using the standard-resolution camera 31B, the polarized illumination, and the high-speed decoding. In such a configuration, the bank B including not only a type of illumination (an illumination condition) and a type of camera (an imaging condition) but also a type of decoding (a decoding condition) can be selectively used to execute decoding in parallel in the core C2 and the core C3, and thus, efficient code reading can be performed.

Meanwhile, the illumination condition for irradiating the workpiece W with the illumination light Li by the illumination unit 2, the imaging condition for capturing an image of the workpiece W by the imaging unit 3, and the decoding condition for decoding the code image Ic can be adjusted by the following tuning. Next, this tuning will be described.

Figure 6:
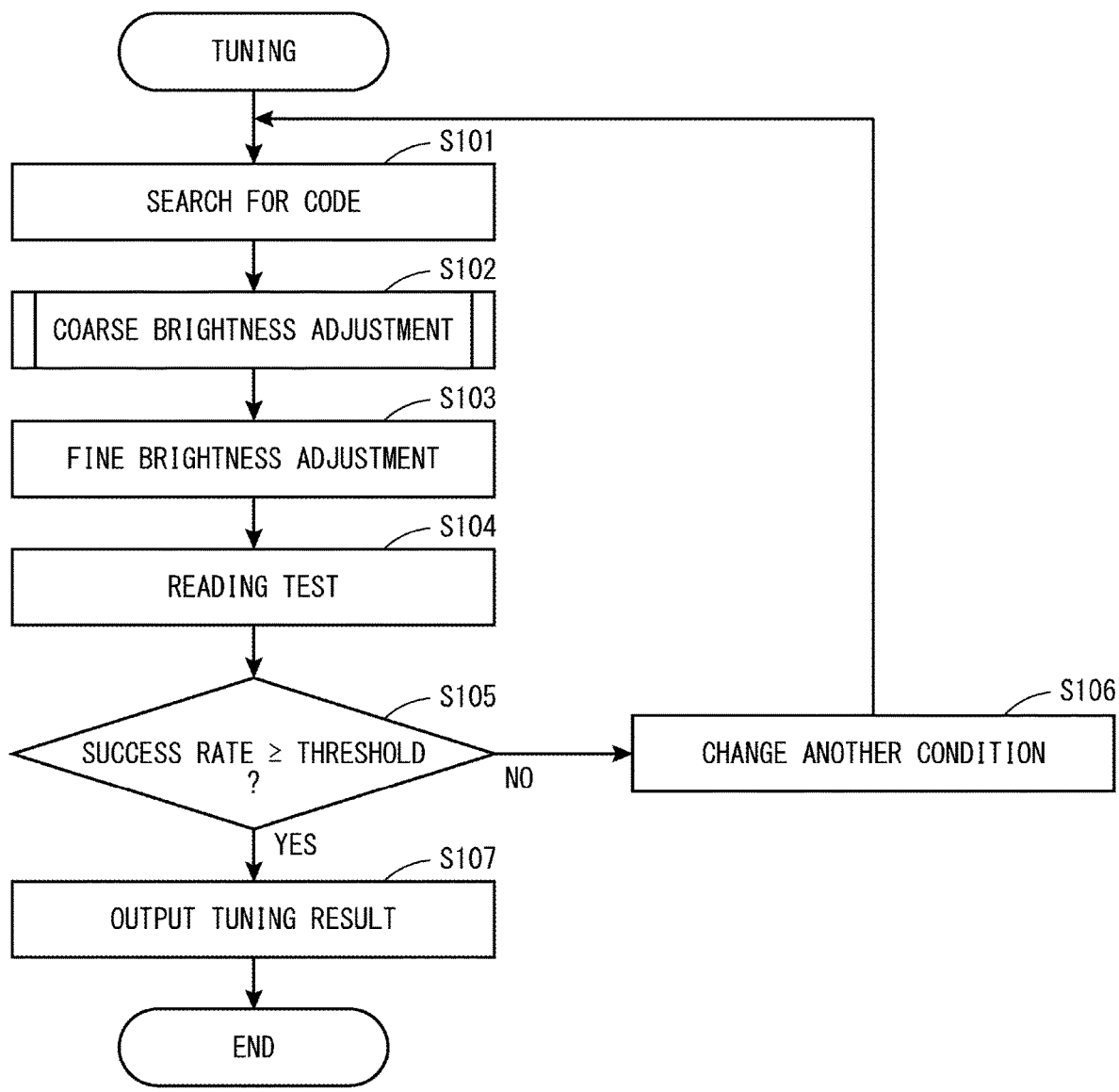
FIG. 6 is a flowchart illustrating an example of tuning.
Figure 7:
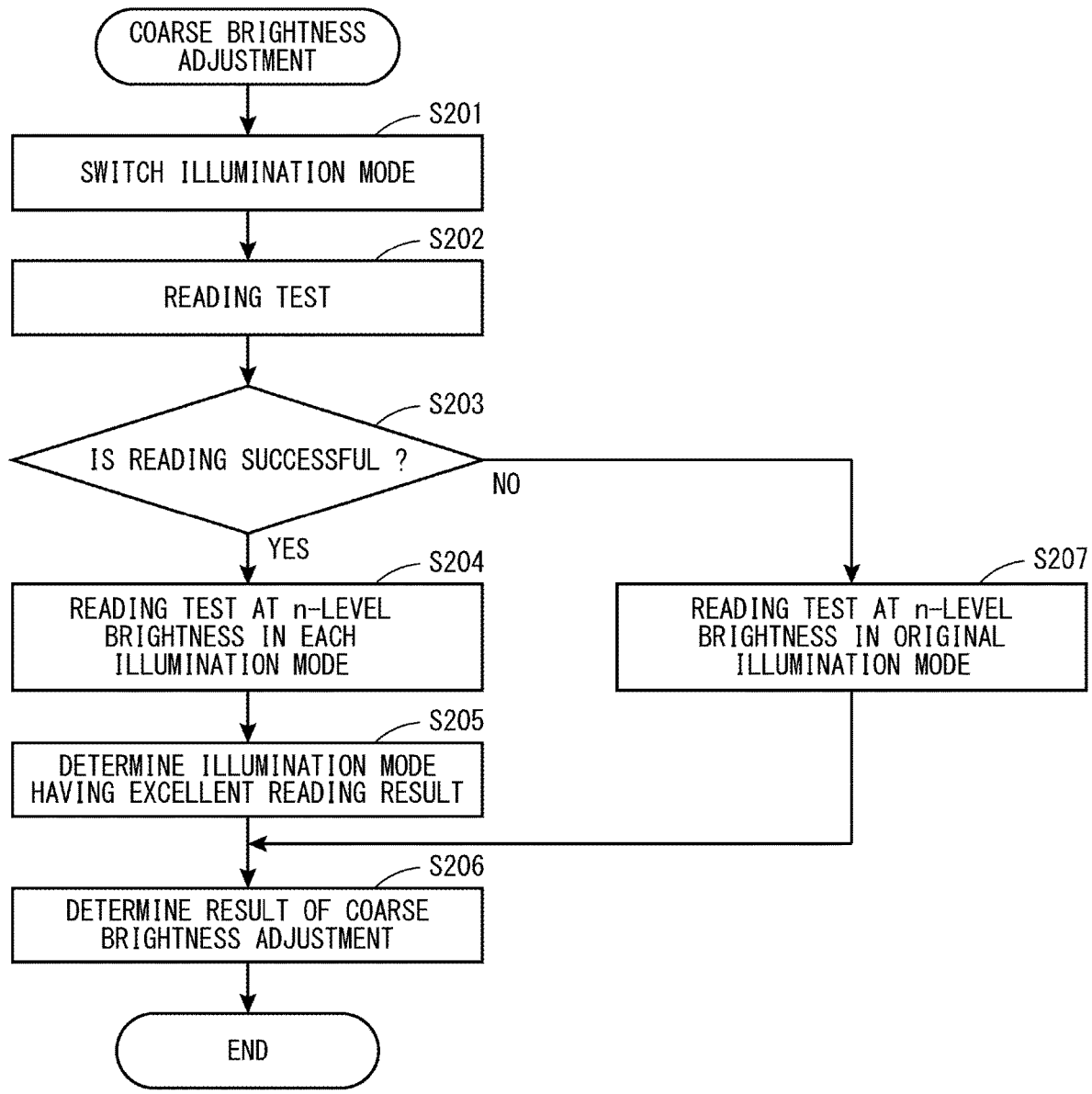
FIG. 7 is a flowchart illustrating an example of coarse brightness adjustment executed in the tuning.

FIG. 6 is a flowchart illustrating an example of the tuning, and FIG. 7 is a flowchart illustrating an example of coarse brightness adjustment executed in the tuning. In Step S101, the controller 4 (a tuning unit) searches for a code. Specifically, the controller 4 causes the imaging unit 3 to execute an imaging operation while causing the illumination unit 2 to execute an illumination operation, thereby generating the code image Ic. Furthermore, the controller 4 decodes the code image Ic to search for a code. This search for a code is executed using an illumination condition, an imaging condition, and a decoding condition set in the controller 4 at that time. That is, in Step S101, code reading is executed using the illumination condition, the imaging condition, and the decoding condition set at that time.

In Step S102, the controller 4 performs coarse brightness adjustment of the illumination light Li emitted by the illumination unit 2 (FIG. 7). As illustrated in FIG. 7, in Step S201, the controller 4 switches an illumination mode by setting an illumination mode different from the illumination mode used in the code search to the illumination unit 2. Further, the controller 4 executes a reading test in the switched illumination mode (Step S202). The reading test is code reading executed to adjust the illumination condition, the imaging condition, or the decoding condition, and the reading test sequentially executes an illumination operation, an imaging operation, and decoding similarly to the code reading.

In Step S203, the controller 4 determines whether the reading test in Step S202 is successful. When the reading test is successful ("YES" in Step S203), the controller 4 executes the reading test at each brightness while gradually changing the brightness of the illumination light Li in each of the illumination mode before switching and the illumination mode after switching (Step S204). In Step S205, the controller 4 determines an illumination mode having an excellent reading result out of the illumination mode before switching and the illumination mode after switching. For example, the illumination mode having a large number of times of success in the reading tests as a result of executing a plurality of the reading tests for each of the illumination modes while changing the brightness of the illumination light Li is determined to be the illumination mode having the excellent read result. In subsequent Step S206, the controller 4 determines, as a result of the coarse brightness adjustment, a median value of the brightness in each of the successful reading tests among the plurality of reading tests executed for the illumination mode having the excellent reading result. Further, the coarse brightness adjustment of FIG. 7 ends.

When it is determined in Step S203 that the reading test in Step S202 has failed ("NO" in Step S203), the controller 4 executes the reading test at each brightness while gradually changing the brightness of the illumination light Li in the illumination mode before switching (Step S207). In subsequent Step S206, the controller 4 determines a median value of the brightness in each of successful reading tests among the plurality of reading tests executed for the illumination mode before switching as a result of the coarse brightness adjustment. Further, the coarse brightness adjustment of FIG. 7 ends.

In this manner, in the coarse brightness adjustment of FIG. 7 (that is, Step S102 in FIG. 6), one appropriate illumination mode out of the illumination mode before switching and the illumination mode after switching and an appropriate brightness in the illumination mode are determined. When the coarse brightness adjustment (Step S102) is ended, the controller 4 performs fine brightness adjustment (Step S103). Specifically, the reading test is executed while changing a brightness of the illumination light Li emitted in one appropriate illumination mode within a predetermined range centered on the appropriate brightness. For example, a plurality of reading tests are executed for the same brightness, and the number of times of success in the reading test at the brightness is obtained. After the number of times of success is obtained for each brightness in this manner, a brightness with the maximum number of times of success is obtained as an optimum brightness.

In Step S104, the controller 4 executes the reading test a plurality of times while setting the brightness of the illumination light Li emitted in one appropriate illumination mode to the optimum brightness obtained in Step S103. In Step S105, the controller 4 determines whether a success rate of successful reading tests in the plurality of reading tests in Step S104 is equal to or more than a predetermined threshold. When the success rate of the reading tests is less than the threshold ("NO" in Step S105), the controller 4 changes a condition other than the illumination condition, that is, the imaging condition or the decoding condition (Step S106), and returns to Step S101. On the other hand, when the success rate of the reading test is equal to or higher than the threshold ("YES" in Step S105), the controller 4 outputs the illumination condition, the imaging condition, and the decoding condition set at that time as a tuning result (Step S107).

The controller 6 executes the above-described tuning, for example, in response to a request from the user. Note that the user can request the controller 6 to execute the tuning by operating the display SP, for example. Then, the controller 6 stores the result obtained by executing the tuning, that is, the combination of the illumination condition, the imaging condition, and the decoding condition, in the storage unit 7. At this time, the controller 6 generates a new bank B as a custom bank B in the storage unit 7, and stores the tuning result in the custom bank B. Therefore, the controller 6 can execute code reading using the illumination condition, the imaging condition, and the decoding condition set for the custom bank in the control illustrated in FIG. 4. In addition, a plurality of the custom banks B can be generated in the storage unit 7 by performing the tuning a plurality of times.

That is, in the examples of FIGS. 6 and 7, the controller 6 (a tuning execution unit) sets illumination conditions and imaging conditions to be conditions suitable for decoding. Further, the plurality of banks B set in the storage unit 7 include a plurality of custom banks each indicating the illumination condition and the imaging condition set by tuning by the controller 6. At this time, code reading in which code image generation processing of generating the code image Ic to be decoded by the core C2 is executed and decoding by the core C2 is executed and code reading in which code image generation processing of generating the code image Ic to be decoded by the core C3 is executed and decoding by the core C3 is executed can be executed under the respective conditions set in the custom banks B different from each other. In such a configuration, when the user handles a special workpiece W, the illumination condition and the imaging condition can be tuned according to the workpiece W, and a code can be reliably read.

As described above, in the present embodiment, the code reading device 1 corresponds to an example of a "code reading device" of the invention, the illumination unit 2 corresponds to an example of an "illumination unit" of the invention, the imaging unit 3 corresponds to an example of an "imaging unit" of the invention, the controller 6 corresponds to an example of a "control unit" of the invention, the core C1 corresponds to an example of the "first core" of the invention, the cores C2 to C4 correspond to an example of the "second core" of the invention, the core C3 corresponds to an example of the "third core" of the invention, and the core C4 corresponds to an example of the "fourth core" of the invention.

Note that the invention is not limited to the above-described embodiment and various modifications can be made to those described above without departing from the gist thereof. For example, the two cameras 31A and 31B included in the imaging unit 3 may be selectively used according to a focal length instead of the resolution. In this modified example, the condenser lens 311A of the camera 31A and the condenser lens 311B of the camera 31B have different focal lengths, and for example, the focal length of the condenser lens 311A is shorter than the focal length of the condenser lens 311B. In other words, the camera 31A is a short-range camera that captures an image of a range shorter than that of the camera 31B, and conversely, the camera 31B is a long-range camera that captures an image of a range longer than that of the camera 31A.

Further, the controller 6 selects one camera to be used for the imaging operation from the cameras 31A and 31B according to the distance to the workpiece W detected by the distance sensor 41 of the distance measuring unit 4. Specifically, the controller 6 selects the short-range camera 31A as the one camera to be used for the imaging operation if the distance to the workpiece W is shorter than a threshold distance, and the controller 6 selects the long-range camera 31B as the one camera to be used for the imaging operation if the distance to the workpiece W is equal to or longer than the threshold distance. The one camera selected in this manner is used to generate the code image Ic in the code image generation processing. In such a configuration, the code image Ic can be captured by a camera having an appropriate focal length, and a success rate of code decoding can be improved.

Meanwhile, the time required for the high-speed decoding is different from the time required for the difficult-to-read decoding as described above. Due to such a difference in the time required for decoding, a timeout period for determining a decoding failure is different between the high-speed decoding and the difficult-to-read decoding. That is, a high-speed timeout period is set for the high-speed decoding, and a difficult-to-read timeout period longer than the high-speed timeout period is set for the difficult-to-read decoding. In addition, decoding management using such timeout periods can be executed as follows.

Figure 8:
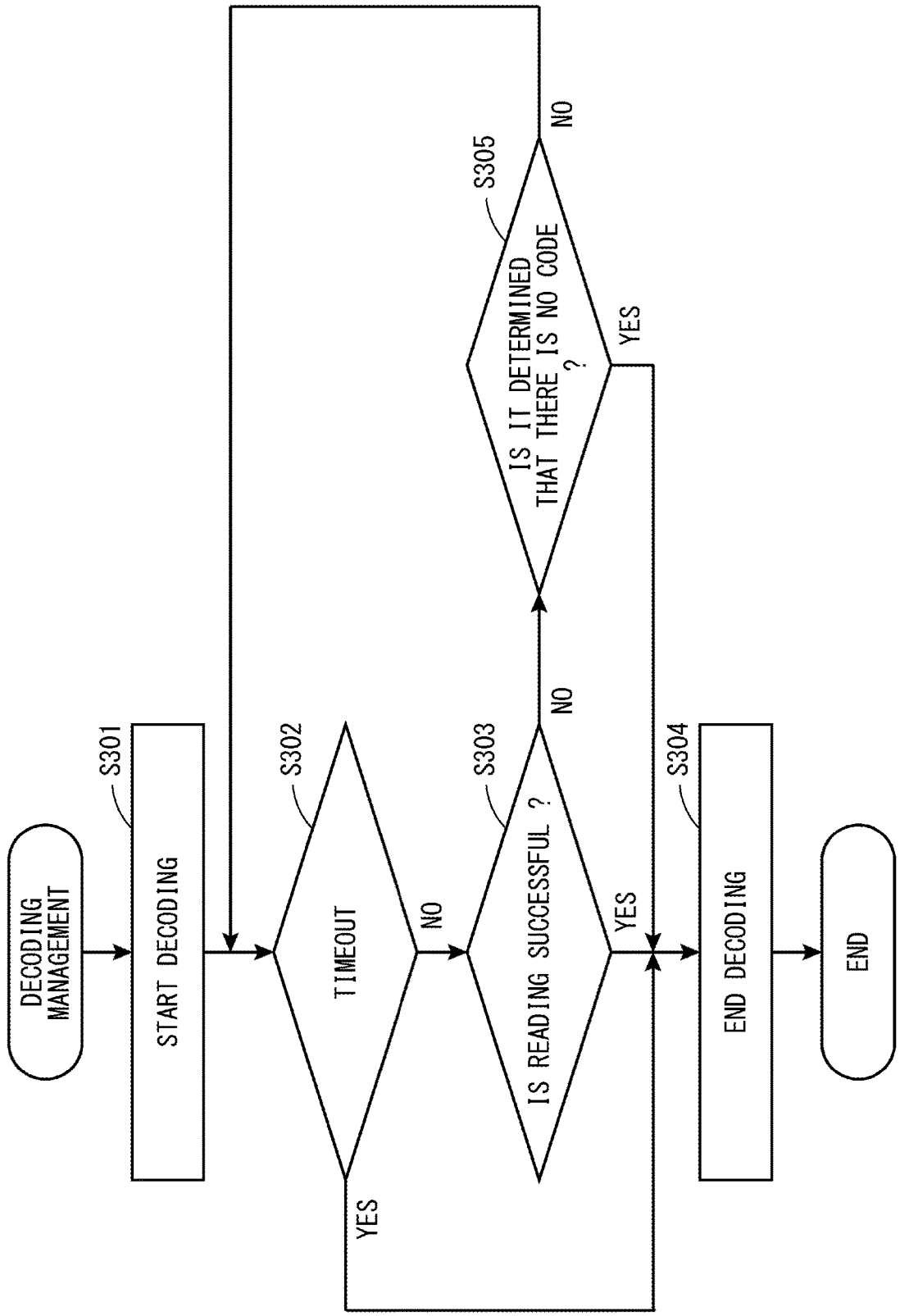
FIG. 8 is a flowchart illustrating an example of decoding management.

FIG. 8 is a flowchart illustrating an example of the decoding management. The flowchart of FIG. 8 is executed by the controller 6. When decoding of the code image Ic is started (Step S301), the controller 6 determines whether a timeout period has elapsed from the start of the decoding in Step S302. When the timeout period has elapsed ("YES" in Step S302), the controller 6 ends the decoding (Step S304).

On the other hand, when the timeout period has not elapsed ("NO" in Step S302), the controller 6 confirms whether the decoding is successful, that is, whether code reading is successful (Step S303). When the success in the code reading has been confirmed ("YES" in Step S303), the controller 6 ends the decoding (Step S304).

When the success in the code reading cannot be confirmed in Step S303 ("NO" in Step S303), the controller 6 confirms whether it is determined that the code image Ic does not include a code, that is, whether it is determined that there is no code (Step S305). When it is not determined that there is no code ("NO" in Step S305), the controller 6 returns to Step S302. On the other hand, when it is determined that there is no code ("YES" in Step S305), the controller 6 ends the decoding (Step S304).

In a case where the decoding management of FIG. 8 is executed in the sequence illustrated in FIG. 4, the following control is executed. That is, in the high-speed imaging control (the first imaging control) in which the code image generation processing is executed while causing the illumination unit 2 to execute one type of illumination mode (the polarized illumination mode), the illumination unit 2 repeatedly executes the one type of illumination mode. Further, when the decoding of the code image Ic by the core C1 (the first core) is successful ("YES" in Step S303) or when it is determined that the code image Ic decoded by the core C1 does not include a code ("YES" in Step S305), the controller 6 newly executes code image generation processing of causing the illumination unit 2 to emit light in one type of illumination mode, thereby generating the code image Ic to be decoded by the core C1. On the other hand, when the decoding of the code image Ic by the core C2 (the second core) is successful ("YES" in Step S303) or when it is determined that the code image Ic decoded by the core C2 does not include a code ("YES" in Step S305), an illumination mode to be executed by the illumination unit 2 is changed among the four types of illumination modes, and code image generation processing is newly executed to generate the code image Ic to be decoded by the core C2. In such a configuration, it is possible to promptly start reading of a new code when the decoding is successful or when it is determined that no code is included.

In addition, when the decoding of the code image Ic is not successful even after a lapse of the high-speed timeout period (a first timeout period) since the start of the decoding of the code image Ic ("YES" in Step S302), the core C1 ends the decoding (Step S304). In addition, when the decoding of the code image Ic is not successful even after a lapse of the difficult-to-read timeout period (a second timeout period) longer than the high-speed timeout period since the start of the decoding of the code image Ic ("YES" in Step S302), the core C2 ends the decoding (Step S304). In such a configuration, a timeout for reading a simple code can be set to be short, a timeout for reading a difficult code can be set to be long, so that the success rate in decoding a difficult code can be improved while maintaining the high speed in decoding a simple code.

Meanwhile, the number of the core C1 that executes the high-speed decoding is smaller than the number of the cores C2 to C4 that execute the difficult-to-read decoding in the above example. However, the number of cores that execute the high-speed decoding may be larger than the number of cores that execute the difficult-to-read decoding. For example, the high-speed decoding can be executed by the cores C1 and C2, and the difficult-to-read decoding can be executed by the core C3. In such a configuration, code reading for a code that is easy to read can be executed using the many cores C1 and C2, and the code can be read quickly. Furthermore, the following decoding management in FIG. 9 may be executed in order to more quickly read a code that is easy to read.

Figure 9:
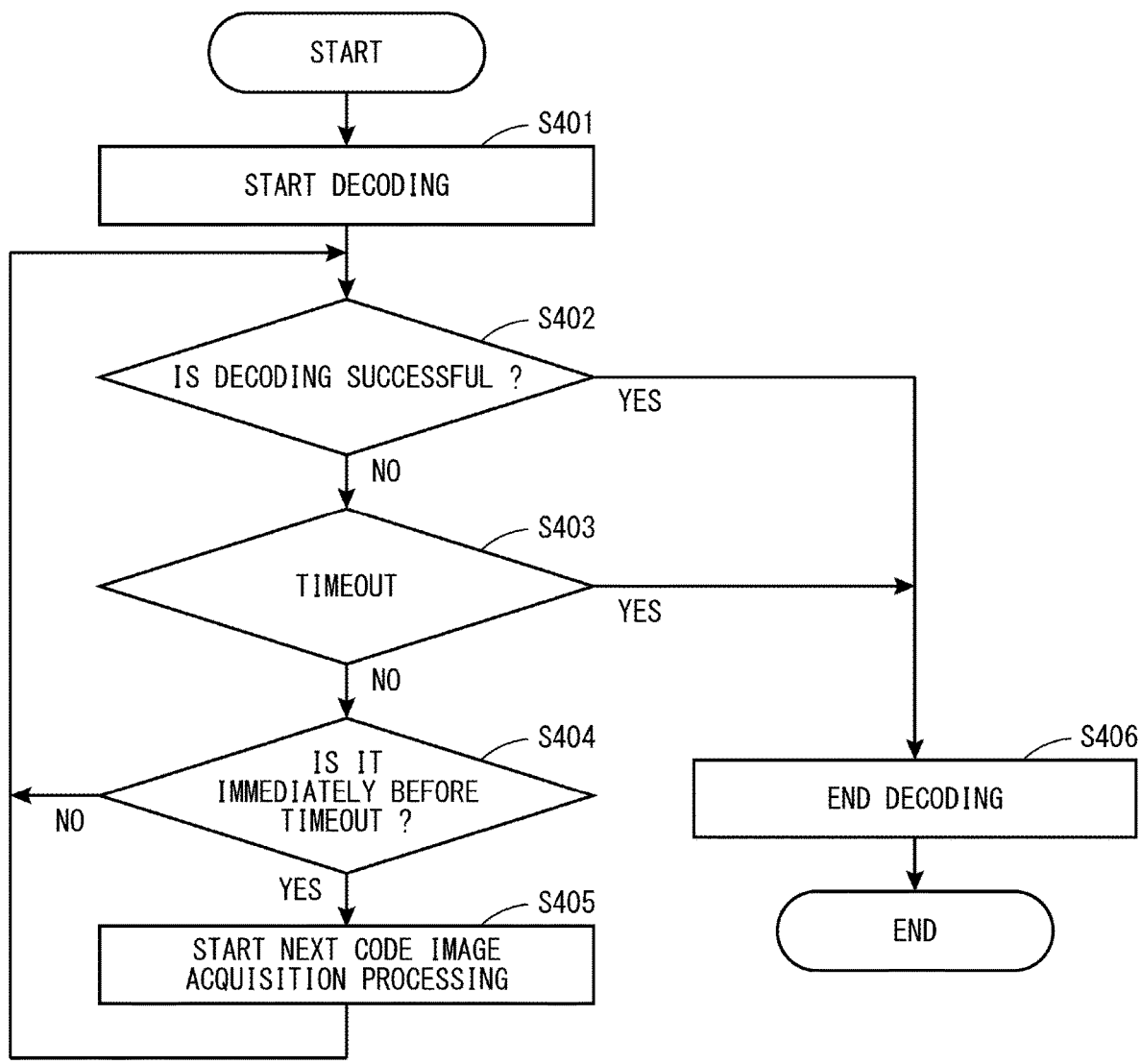
FIG. 9 is a flowchart illustrating a modified example of the decoding management.

FIG. 9 is a flowchart illustrating a modified example of the decoding management. The flowchart of FIG. 9 is executed by the controller 6. In addition, the decoding management in FIG. 9 is executed in common for the cores C1 and C2 that execute the high-speed decoding, the decoding management for the core C1 will be described here.

When the decoding (high-speed decoding) by the core C1 is started (Step S401), the controller 6 confirms whether the decoding by the core C1 is successful in Step S402. When it is confirmed that the decoding by the core C1 is successful ("YES" in Step S402), the controller 6 ends the decoding (Step S406). On the other hand, when the success in the decoding by the core C1 cannot be confirmed ("NO" in Step S402), the controller 6 confirms whether a timeout period has elapsed since the start of decoding (Step S403). When the lapse of the timeout period is confirmed ("YES" in Step S403), the controller 6 ends the decoding (Step S406).

On the other hand, when the timeout period has not elapsed ("NO" in Step S403), the controller 6 determines whether it is immediately before a timeout (Step S404). Specifically, the controller 6 determines whether or not a difference between a time required for the decoding that is being executed by the core C1 and the timeout period set in the core C1 is less than a predetermined time. Further, when the difference is equal to or more than the predetermined time, the controller 6 determines that it is not immediately before the timeout ("NO" in Step S404), and returns to Step S402.

On the other hand, when the difference is less than the predetermined time, the controller 6 determines that it is immediately before the timeout ("YES" in Step S404), executes Step S405, and then returns to Step S402. In Step S405, the controller 6 issues an instruction to the core C0 so as to start code image generation processing of generating the code image Ic that needs to be decoded subsequently to the code image Ic that is being decoded by the core C1. Further, the core C0 receives the instruction from the controller 6 and starts the code image generation processing.

That is, the core C1 (the first core), the core C2 (the second core), and the core C3 (the third core) capable of decoding the code images Ic in parallel are provided in this example. In addition, a timeout period that can be used by the cores C1 and C2 for the decoding is shorter than a timeout period that can be used by the core C3 for the decoding. Further, when a difference between a time required for decoding that is being executed by one core out of the core C1 and the core C2 and the timeout period for the one core is less than the predetermined time ("YES" in Step S404), the controller 6 starts code image generation processing for generating the code image Ic that is to be decoded by the one core (Step S405).

That is, the code image generation processing for decoding that is to be executed next is started without waiting for completion of the decoding that is being executed. As a result, it is possible to improve a success rate in decoding a difficult code while maintaining the high speed in decoding a simple code.

Figure 13:
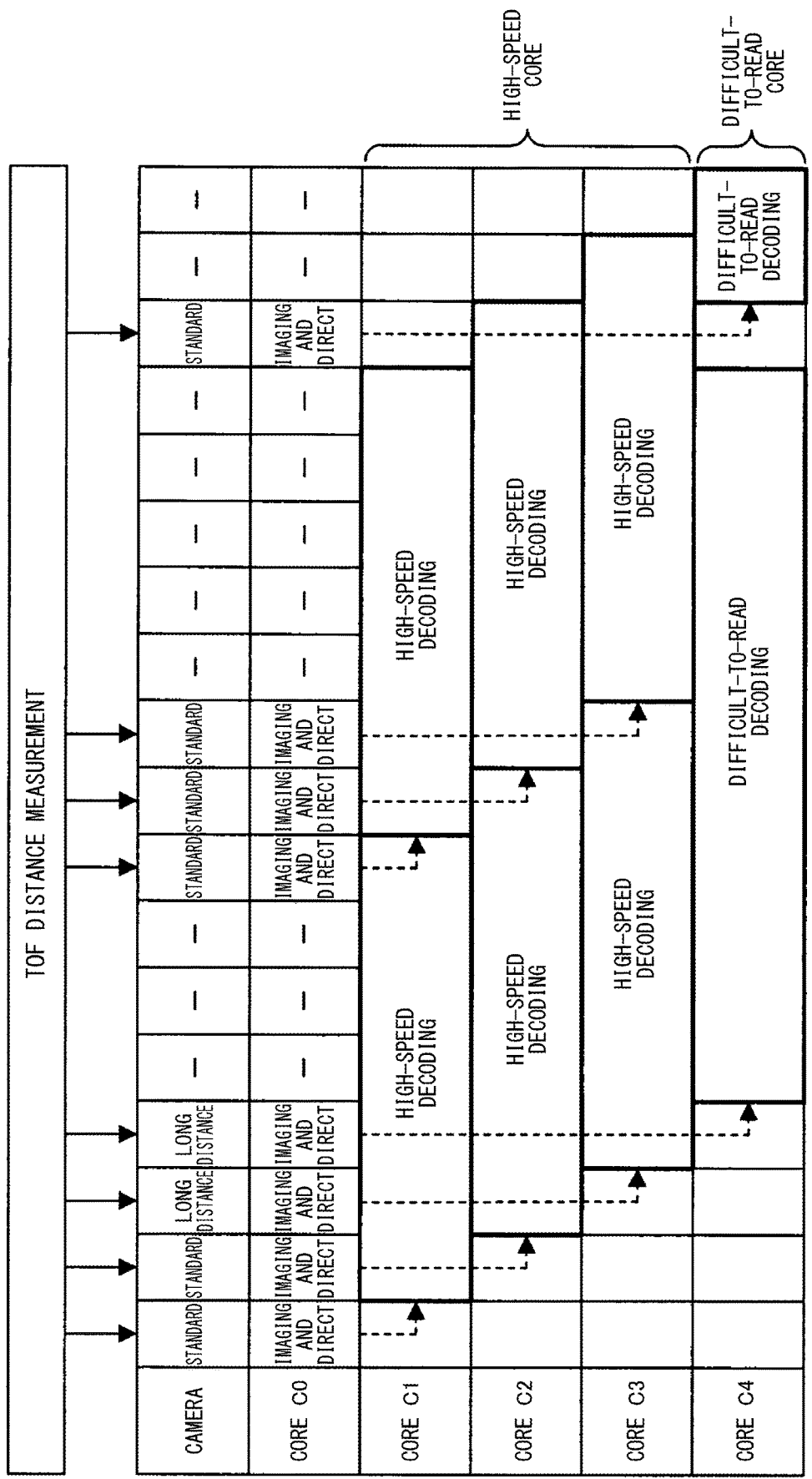
FIG. 13 is a timing chart illustrating an example of a sequence executed by a plurality of cores.

Meanwhile, as illustrated in FIG. 13, for example, the code reading device 1 according to another embodiment different from the above-described embodiment may use the cores C1 to C3 as cores for high-speed decoding and the core C4 as a core for difficult-to-read decoding and set a timeout period that can be used by the cores C1 to C3 for the decoding to be shorter than a timeout period that can be used by the core C4 for the decoding with emphasis on high-speed reading performance rather than difficult-to-read reading performance. When a difference between a time required for decoding that is being executed by one core of the cores C1 to C3 and the timeout period for the one core is less than a predetermined time (immediately before a timeout), the controller 6 may start code image generation processing for generating the code image Ic that is to be decoded by the one core. When there is a core (a core in a standby state) capable of immediately executing decoding, the controller 6 may cause the core to start the code image generation processing for generating the code image Ic that is to be decoded. As a result, even in an environment where simple codes are more than difficult codes, a standby time of each of the cores can be reduced, and a decoding success rate can be maintained by relatively increasing a decoding time for a difficult-to-read core, so that it is possible to achieve both the high speed in decoding the simple codes and the stability in decoding the difficult codes. Note that the above-described another embodiment is not limited to the above-described example, and it is sufficient that the number of cores for high-speed decoding is larger than the number of cores for difficult-to-read decoding (for example, the cores C1 and C2 may be used for the high-speed decoding, and the core C3 may be used for the difficult-to-read decoding). In addition, it may be configured such that one of a plurality of cameras (for example, a camera for a standard distance and a camera for a long distance) may be selected according to a measurement result (a distance) of the distance measuring unit 4.

In addition, in the code reading device 1 according to the above-described another embodiment, the core C1 or the like can be caused to execute decoding (in other words, image processing) optimized according to a type of a code to be read. For example, a coefficient of a filter used in the image processing for executing the decoding are optimized according to the code type, and the coefficient can be included in the decoding condition and stored in the bank B. In particular, for each of a plurality of types of codes, an optimized filter coefficient may be obtained and stored in the bank B. In such a case, it is possible to execute decoding control according to each of the plurality of code types. Incidentally, for example, a code attached to a label and a code formed by DPM are handled as different types of codes.

Figure 10:
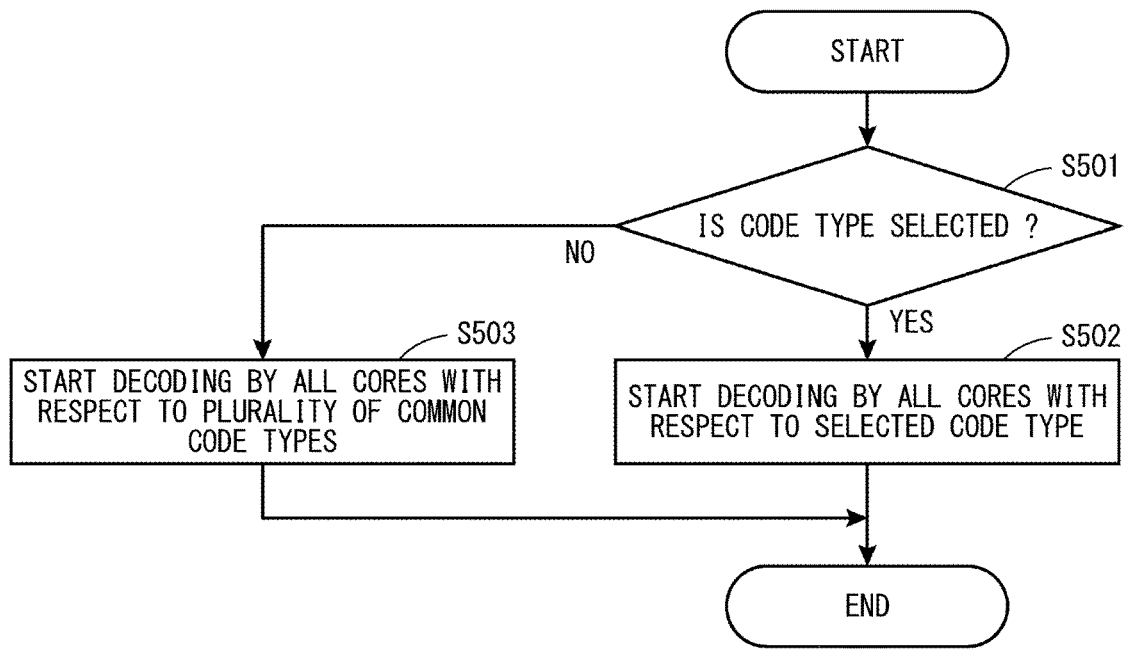
FIG. 10 is a flowchart illustrating an example of decoding control according to a code type.
Figure 11:
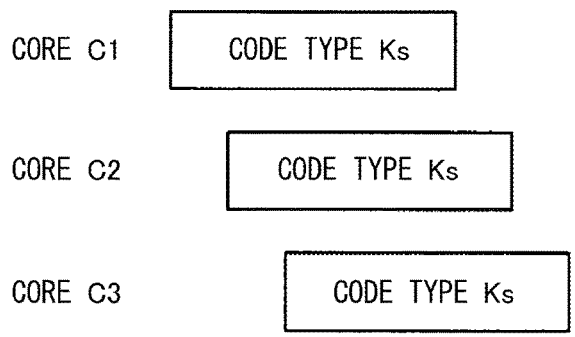
FIG. 11 is a view schematically illustrating an operation executed in the flowchart of FIG. 10.

FIG. 10 is a flowchart illustrating an example of decoding control according to a code type, and FIG. 11 is a view schematically illustrating an operation executed in the flowchart of FIG. 10. The flowchart of FIG. 10 is executed by the controller 6. In Step S501, the controller 6 determines whether one code type is selected by the user from among a plurality of code types. The user can select a code type by operating the display SP, for example. When one code type Ks is selected ("YES" in Step S501), the controller 6 determines to execute decoding (image processing) corresponding to the one code type Ks on the code image Ic in all of the cores C1, C2, and C3. As a result, the cores C1, C2, and C3 execute decoding corresponding to the same code type Ks in parallel on the code images Ic generated by the code image generation processing.

That is, in the examples of FIGS. 10 and 11, the controller 6 (the control unit) receives designation of a type of a code to be read from the user (Step S501). Further, the cores C1, C2, and C3 execute decoding corresponding to the code of the one code type Ks received by the controller 6 (Step S502). Since one code type is fixed as described above, the imaging frequency for reading the code type is maximized, and the probability that an image of the code can be captured in a period in which the code is included in a visual field of the imaging unit 3 is improved.

That is, if a cycle at which an image of the workpiece W is captured is longer than a cycle at which the workpiece W passes the front of the code reading device 1 in a case where the workpieces W pass the front of the code reading device 1 one after another, the workpiece W whose image cannot be captured is generated. In this regard, when the imaging frequency is maximized as described above, it is possible to reliably capture images of the workpieces W.

Figure 12:
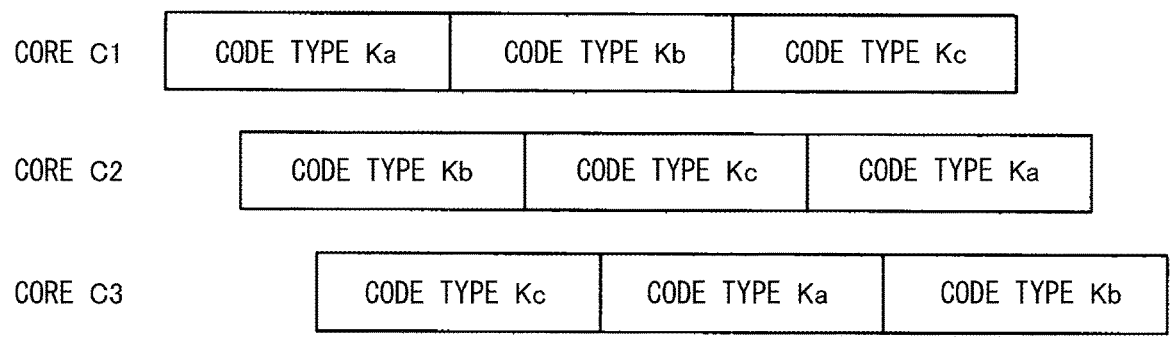
FIG. 12 is a view schematically illustrating an operation executed in a modified example of the decoding control.

In addition, when the code type is not selected by the user in the flowchart of FIG. 10 ("NO" in Step S501), it is also possible to execute decoding control according to a code type as illustrated in FIG. 12 (Step S503). FIG. 12 is a view schematically illustrating an operation executed in a modified example of the decoding control. In this example, a plurality of types of decoding corresponding to a plurality of types of code types Ka, Kb, and Kc are executed. That is, decoding optimized for a code of the code type Ka, decoding optimized for a code of the code type Kb, and decoding optimized for a code of the code type Kc are executed. In addition, each of the cores C1, C2, and C3 sequentially executes the plurality of types of decoding corresponding to the plurality of code types Ka, Kb, and Kc in parallel. At this time, the cores C1, C2, and C3 execute the plurality of types of decoding in different orders.

That is, in the example of FIG. 12, the core C1 (the first core), the core C2 (the second core), and the core C3 (the third core) can execute decoding on codes of the plurality of common types Ka, Kb, and Kc. Further, the core C1, the core C2, and the core C3 execute decoding of the codes of the plurality of types Ka, Kb, and Kc in different orders. In such a configuration, in a case where there is a plurality of code types to be read, it is possible to improve the probability of succeeding in code reading by making code types to be preferentially decoded in the core C1, the core C2, and the core C3 different from each other.

In addition, in the sequence of FIG. 4, the illumination is fixed to the polarized illumination in the high-speed imaging control in which the code image generation processing of generating the code image Ic to be decoded by the core C1 (first core) is executed a plurality of times. However, the illumination used in the high-speed imaging control is not limited to the polarized illumination, and other types of illumination may be used. In addition, the number of types of illumination used in the high-speed imaging control is not necessarily one, and may be two or more.

The invention is applicable to all techniques for generating a code image based on light reflected from a workpiece and decoding the code image to read a code attached to the workpiece.

What is claimed is:

1. A code reading device comprising:
an illumination unit capable of sequentially executing a plurality of types of illumination modes for irradiating a workpiece, provided with a code to be read, with light in mutually different modes in a switching manner;
an imaging unit that receives light emitted from the illumination unit and then reflected by the workpiece to generate a code image; and
a control unit that includes a first core and a second core capable of decoding code images in parallel, causes the imaging unit to generate a code image while causing the illumination unit to execute one illumination mode among the plurality of types of illumination modes, and causes the first core or the second core to execute decoding of the generated code image, wherein
the control unit executes first imaging control for causing the imaging unit to generate a code image while causing the illumination unit to execute N1 types (N1 is an integer of one or more) of illumination modes among the plurality of types of illumination modes, and a second imaging control for causing the imaging unit to generate a code image while causing the illumination unit to execute N2 types (N2 is an integer larger than N1) of illumination modes among the plurality of types of illumination modes,
the first core executes decoding of the code image generated by the first imaging control, and
the second core executes decoding of the code image generated by the second imaging control in parallel with the decoding by the first core.

2. The code reading device according to claim 1, wherein the N2 types of illumination modes executed in the second imaging control include at least any one of illumination modes in which light is emitted by diffuse illumination, polarized illumination, ring illumination, or low-angle illumination.

3. The code reading device according to claim 2, wherein the N2 types of illumination modes further include an illumination mode in which light is emitted by non-diffuse illumination, and the illumination mode is also included in the N1 types of illumination modes executed in the first imaging control.

4. The code reading device according to claim 2, wherein
the control unit further includes a third core capable of decoding a code image in parallel with the first core and the second core, and executes third imaging control for causing the imaging unit to generate a code image while causing the illumination unit to execute N3 types (N3 is an integer larger than N1) of illumination modes among the plurality of types of illumination modes,
the third core executes decoding of the code image generated by the third imaging control,
the N3 types of illumination modes executed in the third imaging control include at least any one of illumination modes in which light is emitted by the diffuse illumination, the polarized illumination, the ring illumination, or the low-angle illumination, and
while the second core executes decoding of a code image generated based on first illumination among the diffuse illumination, the polarized illumination, the ring illumination, and the low-angle illumination, the third core executes decoding of a code image generated based on second illumination, different from the first illumination, among the diffuse illumination, the polarized illumination, the ring illumination, and the low-angle illumination.

5. The code reading device according to claim 1, wherein
the illumination unit includes diffuse illumination that irradiates the workpiece with diffuse light obtained by diffusing light emitted from a light source by a diffuser, and non-diffuse illumination that irradiates the workpiece with the light emitted from the light source without the diffusion by the diffuser, and
the N2 types of illumination modes executed in the second imaging control include an illumination mode in which light is emitted by the diffuse illumination and an illumination mode in which light is emitted by the non-diffuse illumination.

6. The code reading device according to claim 5, wherein
light is emitted by the non-diffuse illumination in the N1 types of illumination modes executed in the first imaging control, and
the first core executes decoding of a plurality of code images generated based on the non-diffuse illumination while the second core executes decoding of a code image generated based on the diffuse illumination and decoding of a code image generated based on the non-diffuse illumination.

7. The code reading device according to claim 5, wherein
the illumination unit is capable of irradiating the workpiece with light from a plurality of irradiation angles different from each other by the diffuse illumination, and is capable of emitting light by each of a plurality of diffuse illumination modes having mutually different combinations of irradiation angles at which light is emitted among the plurality of irradiation angles,
the plurality of types of illumination modes include the plurality of diffuse illumination modes, and
the second core executes decoding of a plurality of code images generated based on the plurality of diffuse illumination modes while the first core executes decoding of a plurality of code images generated based on the non-diffuse illumination.

8. The code reading device according to claim 5, wherein
the illumination unit is capable of irradiating the workpiece with light from a plurality of irradiation angles different from each other by the diffuse illumination, and is capable of emitting light by each of first diffuse illumination and second diffuse illumination which have mutually different combinations of irradiation angles at which light is emitted from among the plurality of irradiation angles, the plurality of types of illumination modes include an illumination mode in which light is emitted by the first diffuse illumination and an illumination mode in which light is emitted by the second diffuse illumination, the control unit further includes a third core capable of decoding a code image in parallel with the first core and the second core and a fourth core capable of decoding a code image in parallel with the first core, the second core, and the third core, and executes third imaging control for causing the imaging unit to generate a code image while causing the illumination unit to execute N3 types (N3 is an integer larger than N1) of illumination modes among the plurality of types of illumination modes and fourth imaging control for causing the imaging unit to generate a code image while causing the illumination unit to execute N4 types (N4 is an integer larger than N1) of illumination modes among the plurality of types of illumination modes, the third core executes decoding of the code image generated by the third imaging control, the fourth core executes decoding of the code image generated by the fourth imaging control, and the second core, the third core, and the fourth core decode code images generated based on mutually different types of illumination among the non-diffuse illumination, the first diffuse illumination, and the second diffuse illumination.

9. The code reading device according to claim 1, wherein
the imaging unit includes a first camera and a second camera that has higher resolution than the first camera,
each of the first camera and the second camera is capable of receiving light reflected by the workpiece to generate a code image,
in the first imaging control, only the first camera out of the first camera and the second camera is used to generate a code image, and
in the second imaging control, both the first camera and the second camera are used to generate code images by switching a camera to be used to generate a code image between the first camera and the second camera.

10. The code reading device according to claim 1, wherein
the illumination unit includes diffuse illumination that irradiates the workpiece with diffuse light obtained by diffusing light emitted from a light source by a diffuser, and non-diffuse illumination that irradiates the workpiece with the light emitted from the light source without the diffusion by the diffuser,
the imaging unit includes a first camera and a second camera that has higher resolution than the first camera,
each of the first camera and the second camera is capable of receiving light reflected by the workpiece to generate a code image,
the control unit further includes a third core capable of decoding a code image in parallel with the first core and the second core, and executes third imaging control for causing the imaging unit to generate a code image while causing the illumination unit to execute N3 types (N3 is an integer larger than N1) of illumination modes among the plurality of types of illumination modes,
the third core executes decoding of the code image generated by the third imaging control, and
the second core and the third core execute decoding in parallel with respect to code images generated based on mutually different generation conditions among a plurality of generation conditions in which combinations of one illumination out of the diffuse illumination and the non-diffuse illumination and one camera out of the first camera and the second camera are different from each other.

11. The code reading device according to claim 1, wherein
the illumination unit includes diffuse illumination that irradiates the workpiece with diffuse light obtained by diffusing light emitted from a light source by a diffuser, and non-diffuse illumination that irradiates the workpiece with the light emitted from the light source without the diffusion by the diffuser, and is capable of irradiating the workpiece with light from a plurality of irradiation angles different from each other by the diffuse illumination, and is capable of emitting light from each of first diffuse illumination and second diffuse illumination which have mutually different combinations of irradiation angles at which light is emitted from among the plurality of irradiation angles,
the imaging unit includes a first camera and a second camera that has higher resolution than the first camera,
each of the first camera and the second camera is capable of receiving light reflected by the workpiece to generate a code image,
the control unit further includes a third core capable of decoding a code image in parallel with the first core and the second core and a fourth core capable of decoding a code image in parallel with the first core, the second core, and the third core, and executes third imaging control for causing the imaging unit to generate a code image while causing the illumination unit to execute N3 types (N3 is an integer larger than N1) of illumination modes among the plurality of types of illumination modes, and executes fourth imaging control for causing the imaging unit to generate a code image while causing the illumination unit to execute N4 types (N4 is an integer larger than N1) of illumination modes among the plurality of types of illumination modes,
the third core executes decoding of the code image generated by the third imaging control,
the fourth core executes decoding of the code image generated by the fourth imaging control, and
the second core, the third core, and the fourth core execute decoding in parallel with respect to code images generated based on mutually different generation conditions among a plurality of generation conditions in which combinations of one illumination out of the first diffuse illumination, the second diffuse illumination, and the non-diffuse illumination and one camera out of the first camera and the second camera are different from each other.

12. The code reading device according to claim 1, wherein
the second core executes image processing using a machine learning model learned to repair a portion, which is inappropriate for decoding and included in a code image generated by the imaging unit, and executes decoding of the code image on which the image processing has been executed, and
the first core executes decoding of a code image without executing the image processing using the machine learning model.

13. The code reading device according to claim 1, further comprising a storage unit that stores a plurality of banks respectively indicating combinations of an illumination condition under which the illumination unit emits light, an imaging condition under which the imaging unit generates a code image, and a decoding condition under which the control unit performs decoding, wherein the plurality of banks include the combinations in which at least one of the illumination condition, the imaging condition, and the decoding condition is different from each other, the control unit further includes a third core capable of decoding a code image in parallel with the first core and the second core, and executes third imaging control for causing the imaging unit to generate a code image while causing the illumination unit to execute N3 types (N3 is an integer larger than N1) of illumination modes among the plurality of types of illumination modes, the third core executes decoding of the code image generated by the third imaging control, and a process of executing the second imaging control and decoding in the second core and a process of executing the third imaging control and decoding in the third core are executed using the banks different from each other.

14. The code reading device according to claim 13, further comprising a tuning execution unit that sets the illumination condition and the imaging condition to be conditions suitable for decoding, wherein the plurality of banks include a plurality of custom banks each indicating the illumination condition and the imaging condition set by the tuning execution unit, and a process of executing the second imaging control and decoding in the second core and a process of executing the third imaging control and decoding in the third core are executed using the custom banks different from each other.

15. A code reading method for generating a code image by causing an imaging unit to receive light reflected from a workpiece provided with a code to be read while switching an illumination mode executed by an illumination unit capable of executing a plurality of types of illumination modes for irradiating the workpiece with light in mutually different modes, the code reading method comprising:

a step of causing the imaging unit to generate a code image while causing the illumination unit to execute one illumination mode among the plurality of types of illumination modes; and a step of causing a first core or a second core to decode the code image, wherein the first core decodes a code image generated by the imaging unit while the illumination unit executes N1 types (N1 is an integer of one or more) of illumination modes among the plurality of types of illumination modes, the second core decodes a code image generated by the imaging unit while the illumination unit executes N2 types (N2 is an integer larger than N1) of illumination modes among the plurality of types of illumination modes, and the decoding by the second core is executed in parallel with the decoding by the first core.

* * * * *